US011244486B2

(12) United States Patent
Agrawal et al.

(10) Patent No.: US 11,244,486 B2
(45) Date of Patent: Feb. 8, 2022

(54) SHAPE JOINING BASED ON PROXIMITY

(71) Applicant: Adobe Inc., San Jose, CA (US)

(72) Inventors: Vivek Agrawal, Noida (IN); Tarun Beri, Noida (IN)

(73) Assignee: Adobe Inc., San Jose, CA (US)

(*) Notice: Subject to any disclaimer, the term of this patent is extended or adjusted under 35 U.S.C. 154(b) by 47 days.

(21) Appl. No.: 16/902,100

(22) Filed: Jun. 15, 2020

(65) Prior Publication Data

US 2021/0390744 A1 Dec. 16, 2021

(51) Int. Cl.
| | | |
|---|---|---|
| *G06T 11/60* | (2006.01) | |
| *G06T 11/40* | (2006.01) | |
| *G06T 11/20* | (2006.01) | |

(52) U.S. Cl.
CPC ............ *G06T 11/60* (2013.01); *G06T 11/203* (2013.01); *G06T 11/40* (2013.01)

(58) Field of Classification Search
CPC ......... G06T 11/60; G06T 11/203; G06T 11/40
See application file for complete search history.

(56) References Cited

U.S. PATENT DOCUMENTS

| 7,508,400 B2 * | 3/2009 | Fuki ...................... G01C 21/32 |
| | | 345/418 |
| 2010/0114519 A1 * | 5/2010 | Hollingshead ......... G01B 21/16 |
| | | 702/113 |
| 2013/0027402 A1 * | 1/2013 | Iskenderian ............ G06T 11/40 |
| | | 345/440 |
| 2019/0147649 A1 * | 5/2019 | Brochu ................. G06T 17/205 |
| | | 345/420 |
| 2020/0034497 A1 * | 1/2020 | Goswami ................ G06F 30/00 |

OTHER PUBLICATIONS

Schmidt R., Brochu T.: Adaptive mesh booleans. http://arxiv.org/abs/1605.01760, 2016. pp. 1-10 (Year: 2016).*

* cited by examiner

*Primary Examiner* — Jennifer Mehmood
*Assistant Examiner* — Andrew Shin
(74) *Attorney, Agent, or Firm* — FIG. 1 Patents

(57) ABSTRACT

Shape joining based on proximity is leveraged in a digital medium environment. For instance, an automated system is provided to detect shape proximity and to implement automated shape joining when shapes are detected within a threshold proximity. In an example implementation, when a first shape is detected within a threshold proximity to a second shape, the described processes automatically calculate a join geometry for connecting the shapes, and automatically apply the join geometry to join the shapes and generate a joined shape. Thus, utilizing the described techniques, shapes of differing geometries can be automatically joined. Further, joined shapes can be edited and transformed in different ways.

20 Claims, 21 Drawing Sheets

1200

1202

SHAPE JOINING BASED ON PROXIMITY

BACKGROUND

Digital graphics editing systems are implemented to generate and edit visual objects, such as digitally-created visual objects, digital photographs, digital animations, and so forth. Some common graphics editing techniques manipulate fundamental Bézier shapes (e.g., Bézier circles) to generate higher-order vector geometries. For instance, multiple Bézier shapes can be joined to form more complex shapes. Conventional graphics systems for joining Bézier shapes, however, experience a number of implementation challenges. For instance, to join multiple Bézier shapes, conventional graphics systems typically utilize a manual "cut and join" operation to cut open the shapes and join the shapes at the cut regions. Such cut and join operations, however, are complex and require extensive user input.

For example, to join two Bézier circles using conventional graphics systems, a user must typically manually identify precise cut locations on both circles, select and delete portions of the circles to be removed, and apply multiple manual "path join" operations between the circles to join two circles. At this point, the joined circles are typically visually irregular at the joined regions, and thus the user will typically need to perform multiple manual path manipulations to achieve a desired visual appearance, such as by manipulating edit handles in the joined region of the circles to smooth the joined region. Further, for Bézier shapes, such cut and join operations do not always ensure conformance with Bézier continuity, such as C0 and C1 continuity.

Thus, joining shapes using conventional graphics editing systems can be burdensome not only from a user perspective, but also on system resources. For instance, joining shapes to achieve a desired visual appearance requires users to engage in numerous manual interactions with such systems to attempt to generate and edit a desired shape. Further, the limited ability to apply edits to a generated shape further exacerbates this problem. This not only presents an undesirable user experience, but wastes system resources (e.g., processor bandwidth, memory, network bandwidth, and so forth) utilized to manually join and edit multiple shapes.

SUMMARY

Shape joining based on proximity is leveraged in a digital medium environment. For instance, to mitigate the challenges of excessive burdens on user and system resources experienced in typical graphics editing systems, the described graphics editor system provides an automated system to detect shape proximity and to implement automated shape joining when shapes are detected within a threshold proximity. For instance, when a first shape is detected within a threshold proximity to a second shape, the described processes automatically calculate a join geometry for connecting the shapes, and automatically apply the join geometry to join the shapes and generate a joined shape. Thus, utilizing the described techniques, shapes of differing geometries can be automatically joined. Further, joined shapes can be edited and transformed in different ways.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1A:
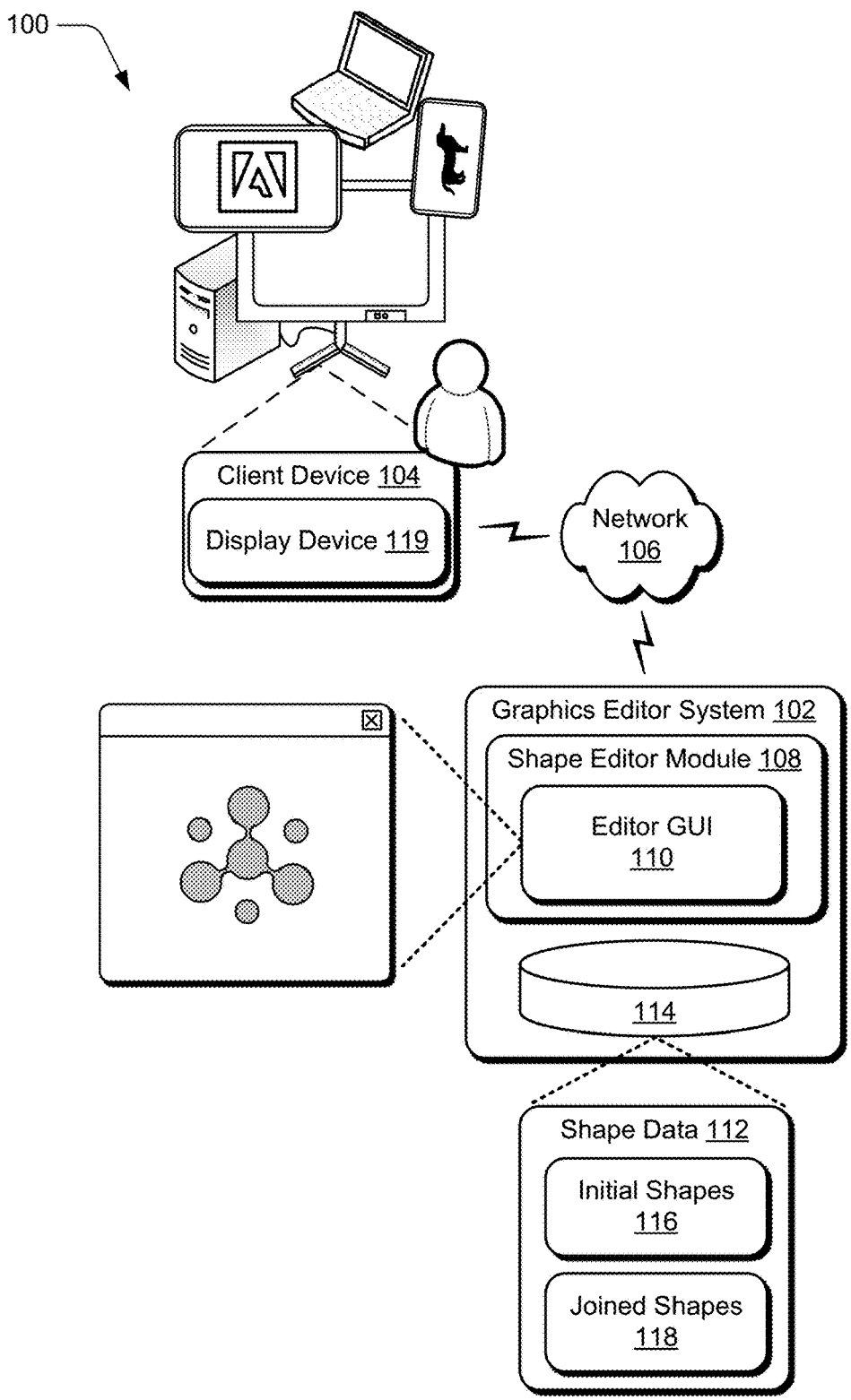
FIG. 1a is an illustration of an environment in an example implementation that is operable to employ techniques described herein.

To overcome the challenges to joining shapes presented in typical graphics editing systems, shape joining based on proximity is leveraged in a digital medium environment. For instance, to mitigate the challenges of excessive burdens on user and system resources experienced when attempting to join shapes using typical graphics editing systems, the described graphics editor system provides an automated system to detect shape proximity and to implement automated shape joining when shapes are detected within a threshold proximity.

For instance, consider a scenario where a set of shapes are presented by a graphics editor system in a graphical user interface (GUI). Further, a proximity join mode is active on the graphics editor system, such as based on user input to activate the proximity join mode. A user then manipulates one of the shapes, such as by dragging the shape within the GUI toward another of the shapes. The shape that receives user input is designated as a "source shape" that can be used to initiate a shape join operation. As a result of the user manipulation of the source shape, the graphics editor system detects that the source shape comes within a threshold proximity to a different shape, designated as a "target shape." Generally, the threshold proximity is based on a defined proximity region that surrounds a perimeter of the source shape. The proximity region, for instance, is defined as a logical perimeter that extends outwardly and equidistantly from a visual perimeter of the source shape.

In response to detecting the target shape within the threshold proximity to the source shape, the graphics editor system initiates a shape join operation to visually join the target shape to the source shape. Accordingly, a join region geometry is calculated for generating a join region for joining the target shape to the source shape. The join region, for instance, is utilized as a visual connection for visually connecting the target shape to the source shape as part of a shape join operation. In at least one example way for calculating the join region geometry, a logical line between closest points on the perimeters of the source shape and the target shape is generated, and this logical line is designated as a central axis for the join region. Further, outer logical boundaries of the join region are defined on either side of the central axis. The graphics editor system then perforates (e.g., cuts) the perimeters of the source shape and the target shape at the intersection of the outer logical boundaries and the respective shape perimeters, and connects the target shape to the source shape by generating the join region between the perforated regions of the shape perimeters to generate a joined shape.

In at least one implementation, the graphics editor system generates the join region by generating outer perimeters of the join region within and/or overlapping with the defined logical boundaries. For instance, perimeters of the join region can be generated as curves (e.g., Bézier curves) that attach to the perimeters of the source shape and the target shape. Further, endpoints of the curves can be attached coincident with the intersection points of the logical boundaries and the shape perimeters. In implementations that utilize Bézier curves, attaching the curves at such intersection points enables C0 continuity for the curves to be maintained. Further to Bézier curve implementations, control points for the curves can be positioned to be colinear with attachment points for the curves on each of the shape perimeters and an adjacent control point on each of the shape perimeters. Generally, this enables C1 continuity of the curves to be maintained.

In at least some implementations, when a user manipulates a source shape, multiple candidate target shapes occur within a threshold proximity to the source shape. Accordingly, the graphics editor system can measure distances between the closest points on the perimeter of the source shape and points on the perimeters of the respective target shapes. The target shape that is determined to be closest to the source shape can be selected for a shape join operation, and other more distant shapes can be excluded from the shape join operation. However, some implementations allow for multiple target shapes to be joined to a source shape. For instance, consider a scenario where a source shape is manipulated within a threshold proximity to multiple target shapes. The graphics editor system measures distances between the perimeter of the source shape, and the perimeters of the respective target shapes. The graphics editor system then determines that the distances are approximately equal based on a threshold distance difference. The threshold distance difference, for example, is defined as +/−ε distance units, such as measured in pixels, vector distance, and/or other suitable distance unit. Accordingly, the graphics editor system executes a shape join operation to join the multiple target shapes to the source shape.

Generally, after a target shape is joined to a source shape via a join region to generate a joined shape, the joined shape can be edited in various ways. For instance, control points for the join region can be manipulated to edit the join region geometry, such as to increase and/or decrease a curvature of the join region. Further, a source shape region and/or target shape region of the joined shape can be manipulated, such as to change a distance between the regions. When a distance between a source shape region and a target shape region of a joined shape is edited (e.g., increased or decreased), a geometry of the join region can be dynamically recalculated and applied to maintain connectivity between the source shape region and the target shape region. However, at least some implementations enable a joined shape to be disconnected. For instance, a disconnect threshold distance can be defined such that when a source shape region and/or a target shape region of a joined shape is manipulated more than the disconnect threshold distance from the other respective shape region, the target shape region can be disconnected from the source shape region. In such a scenario, the source shape and the target shape can be re-rendered in their original form as they were presented prior to a shape join operation.

Accordingly, techniques for shape joining based on proximity overcome the deficiencies of traditional ways for joining shapes. For instance, by utilizing an automated join mode based on shape proximity to join shapes, joined shapes can be dynamically generated without requiring manual user interactions to manually define precise shape join geometries. Further, by implementing specific shape join geometry constraints for a join region for joining shapes, geometric continuities of a join region can be maintained to avoid undesirable visual arrangements of the joint region. In this way, dynamic and accurate shape joining provided by the described techniques can be leveraged to reduce inaccuracies and resource wastage experienced in conventional graphics editing systems.

Term Descriptions

These term descriptions are provided for purposes of example only and are not intended to be construed as limiting on the scope of the claims.

As used herein, the term "shape" refers to a digital visual object with various visual and geometric attributes, such as size and orientation. Generally, a shape may be generated in various ways, such as a visual object created via an image editing system, a visual object taken from a digital photograph, a visual objected generated by an artificial intelligence technique, and so forth.

As used herein, the term "join" refers to a computational process for connecting shapes to one another. For instance, a join process as described herein is executed to visually connect one shape to another shape to create a new shape, e.g., a joined shape. In at least some implementations, joining two shapes involves generating a "join region," which represents a visual connector for connecting the shapes.

As used herein, the term "join geometry" refers to data that describes how a set of shapes (e.g., two or more shapes) are to be connected to one another. For instance, join geometry data describes which regions of shapes' perimeters are to be used for joining the shapes; size, orientation, and curvature attributes of a join region used to join the shapes; shape fill patterns to be used for filling shapes and/or a join region, and so forth.

As used herein, the terms "threshold proximity" and "proximity region" refer to logical zones that are defined externally to a perimeter of a shape and that are leveraged to implement a join process. In at least some implementations, a proximity region can be predefined, such as a specific distance that extends outwardly from a perimeter of a shape. Alternatively or additionally, a proximity region can be user defined, such as by user input to the graphics editor systems described herein.

In the following discussion, an example environment is first described that may employ the techniques described herein. Example scenarios and procedures are then described which may be performed in the example environment as well as other environments. Performance of the example scenarios and procedures is not limited to the example environment and the example environment is not limited to performance of the example scenarios and procedures. Finally, an example system and device are described that are representative of one or more computing systems and/or devices that may implement the various techniques described herein.

Example Environment

FIG. 1a is an illustration of an environment 100 in an example implementation that is operable to employ shape joining based on proximity as described herein. The illustrated environment 100 includes a graphics editor system 102 and a client device 104 that are communicatively coupled, one to another, via a network 106.

Computing devices that are usable to implement the graphics editor system 102 and the client device 104 may be configured in a variety of ways. A computing device, for instance, may be configured as a server device, a desktop computer, a laptop computer, a mobile device (e.g., assuming a handheld configuration such as a tablet or mobile phone), and so forth. Additionally, a computing device may be representative of a plurality of different devices, such as multiple servers utilized by a business to perform operations "over the cloud" as further described in relation to FIG. 20.

The graphics editor system 102 includes a shape editor module 108 that is representative of functionality to enable shapes to be joined further to techniques for shape joining based on proximity described herein. Accordingly, the shape editor module 108 implements an editor graphical user interface (GUI) 110 that represents functionality for receiving user interaction to perform various shape editing actions, as well as to output visual indications of shape editing actions.

The graphics editor system 102 further includes shape data 112 stored on a storage 114. Generally, the shape data 112 represents data that can be utilized by and result from operation of the shape editor module 108. The shape data 112, for instance, includes initial shapes 116 and joined shapes 118. The initial shapes 116 represent different shapes that can be joined utilizing the techniques described herein to generate joined shapes 118. Examples of the initial shapes 116 include Bézier shapes, geometric primitives, 3-dimensional (3D) shapes, and so forth. As detailed below, the described techniques can be implemented to join different instances of the initial shapes 116 to generate a variety of different joined shapes 118. The joined shapes 118, for instance, represent shapes that are generated by visually connecting different instances of the initial shapes 116.

To enable various input and output according to the described techniques, the client device 104 includes a display device 119, which represents functionality for visual output of various aspects of techniques for shape joining based on proximity. The display device 119, for instance, can output the editor GUI 110, and can receive user interaction to perform various aspects of the described techniques.

Figure 1B:
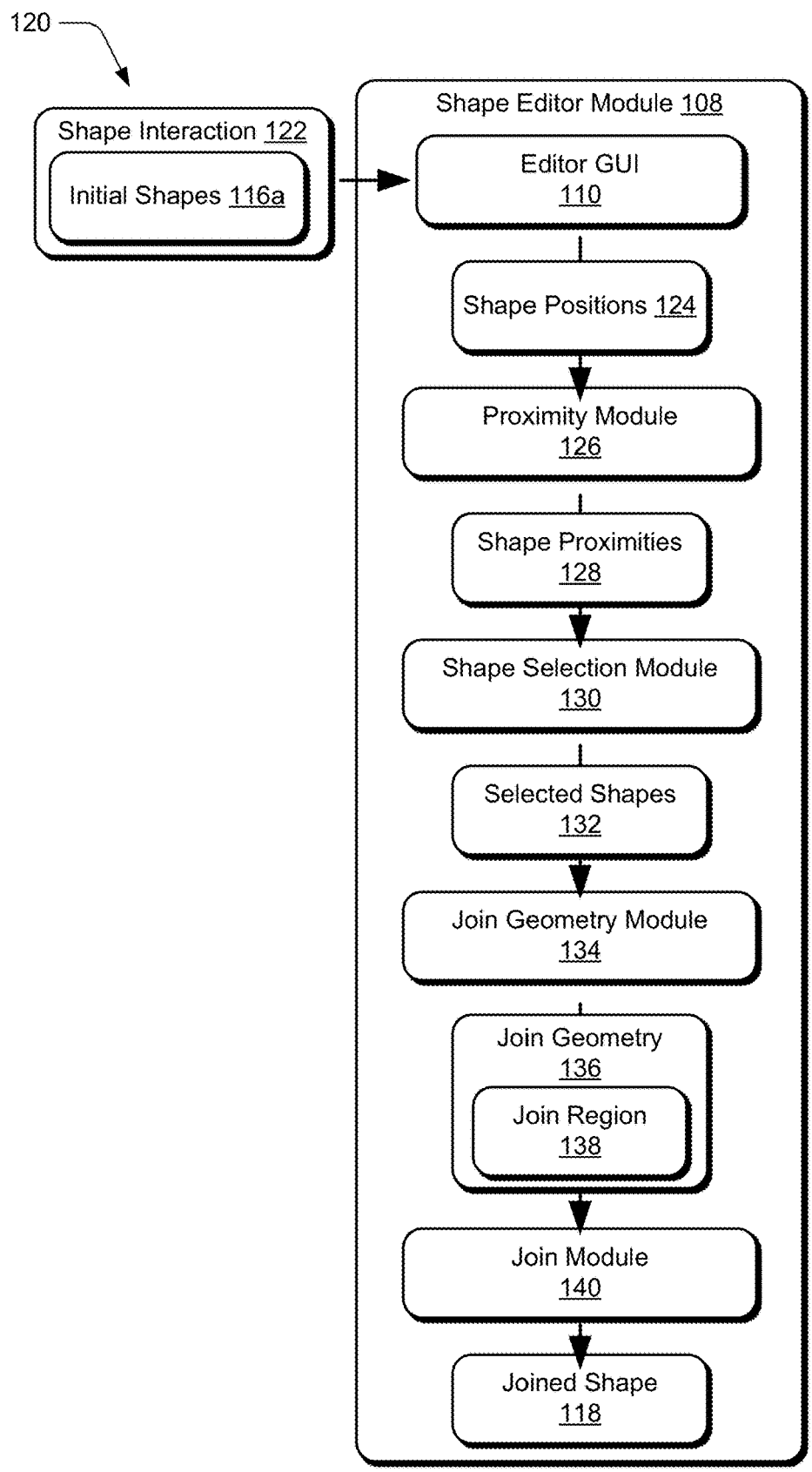
FIG. 1b depicts an example system illustrating an example overview of operation of a shape editor module for implementing techniques for shape joining based on proximity.

FIG. 1b depicts an example system 120 illustrating an example overview of operation of the shape editor module 108 for implementing techniques for shape joining based on proximity. In the system 120, a shape interaction 122 with a set of initial shapes 116a is detected by the shape editor module 108. The initial shapes 116a, for instance, represents a subset of the initial shapes 116. The shape interaction 122, for instance, describes user manipulation of an initial shape 116a relative to one or more other initial shapes 116a, such as via user interaction with the editor GUI 110. For example, a user selects and drags an initial shape 116a toward another initial shape 116a. Accordingly, shape positions 124 are input to a proximity module 126, which determines shape proximities 128 for the initial shapes 116a. The shape positions 124, for instance, represent data that describes positions (e.g., absolute and/or relative positions) of each of the initial shapes 116a within the editor GUI 110, such as pixel coordinates for perimeters of each of the initial shapes 116a, refined points of a vector path, etc.

Accordingly, based on the shape positions 124, the proximity module 126 determines the shape proximities 128. Generally, the shape proximities 128 represent data that describes distances between perimeters of the initial shapes 116a. For example, for each pair of the initial shapes 116a, the proximity module 126 calculates a distance between closest points on the perimeters of the respective shapes. The shape proximities 128 are input to a shape selection module 130, which compares the shape proximities 128 and selects selected shapes 132 to be joined as part of a join operation. The shape selection module 130, for instance, determines that the selected shapes 132 are within a threshold proximity to each other, such as based on a defined proximity region that surrounds one or more of the selected shapes 132.

Data describing the selected shapes 132 (e.g., shape position, shape proximity, shape size, shape geometry, etc.) is then input to a join geometry module 134, which calculates a join geometry 136 for joining the selected shapes 132 to each other. The join geometry 136, for instance, describes which portions of the selected shapes 132 are to be utilized to join the shapes, such as regions on the perimeter of each of the selected shapes 132 to be used to connect the respective shapes. The join geometry 136 further describes a join region 138, which represents a visual connector to be used to join the selected shapes 132. The join region 138, for instance, includes various visual attributes, such as length and width of the join region 138, curvature of boundaries of the join region 138, and so forth. In implementations where Bézier curves are utilized to join the selected shapes, the join region 138 can include a curvature of Bézier curves to be used to generate the join region 138.

Accordingly, a join module 140 applies the join geometry 136 to connect the selected shapes 132 and generate a joined shape 118. For instance, and as further detailed below, a portion of the perimeter of each of the selected shapes 132 is perforated (e.g., cut and removed) and the join region is connected at the perforated portions to join the selected shapes 132 and generate the joined shape 118.

In at least some implementations, different operations pertaining to generating the joined shape 118 are performed automatically and independent of user interaction with the graphics editor system 102. For instance, after a user performs the shape interaction 122, the remaining operations described in the system 120 are performed automatically by the shape editor module 108 without requiring user input, such as to identify the selected shapes 132, specify the join geometry 136, and generate the joined shape 118.

Having considered an example environment and system, consider now a discussion of some example details of the techniques for shape joining based on proximity in a digital medium environment in accordance with one or more implementations.

Implementation Details

Figure 2:
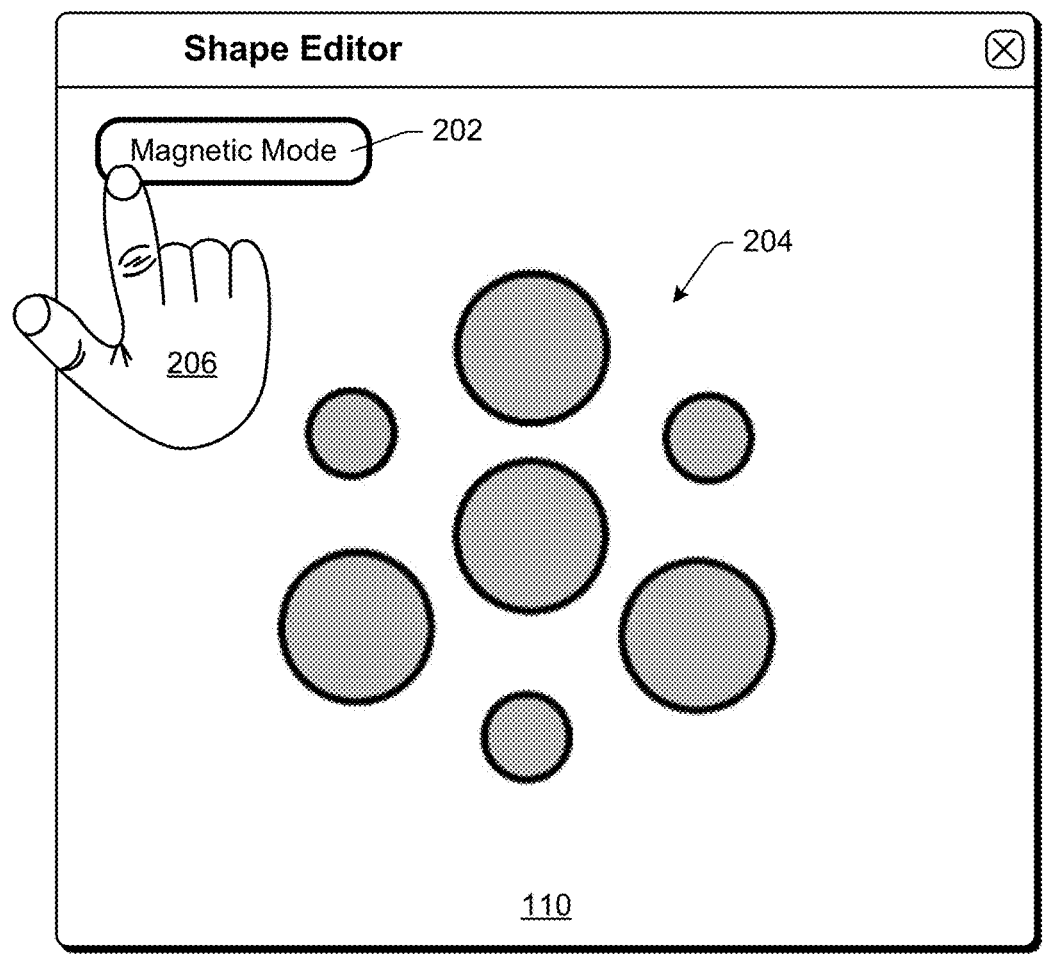
FIG. 2 depicts an example scenario for enabling a proximity join mode.

FIGS. 2-15 depict different implementation details for shape joining based on proximity in accordance with one or more implementations. For instance, FIG. 2 depicts an example scenario 200 for enabling a proximity join mode. The scenario 200 depicts the editor GUI 110 including a join mode control 202 that is selectable to enable and disable a proximity join mode according to the described techniques. In this particular example, the join mode control 202 identifies the proximity join mode as a "Magnetic Mode" due to the similarity between the join mode physics and behavior of a real-world magnet in proximity to a magnetically active material, such as a ferromagnetic material. The editor GUI 110 also displays a set of shapes 204 that can be manipulated and edited in various ways via interaction with the editor GUI 110. The shapes 204, for example, represent instances of the initial shapes 116. To enable the proximity join mode, a user selects the join mode control 202, such as via touch input via the user's hand 206 to the display device 119 displaying the editor GUI 110. Accordingly, the proximity join mode is activated by the shape editor module 108.

Figure 3:
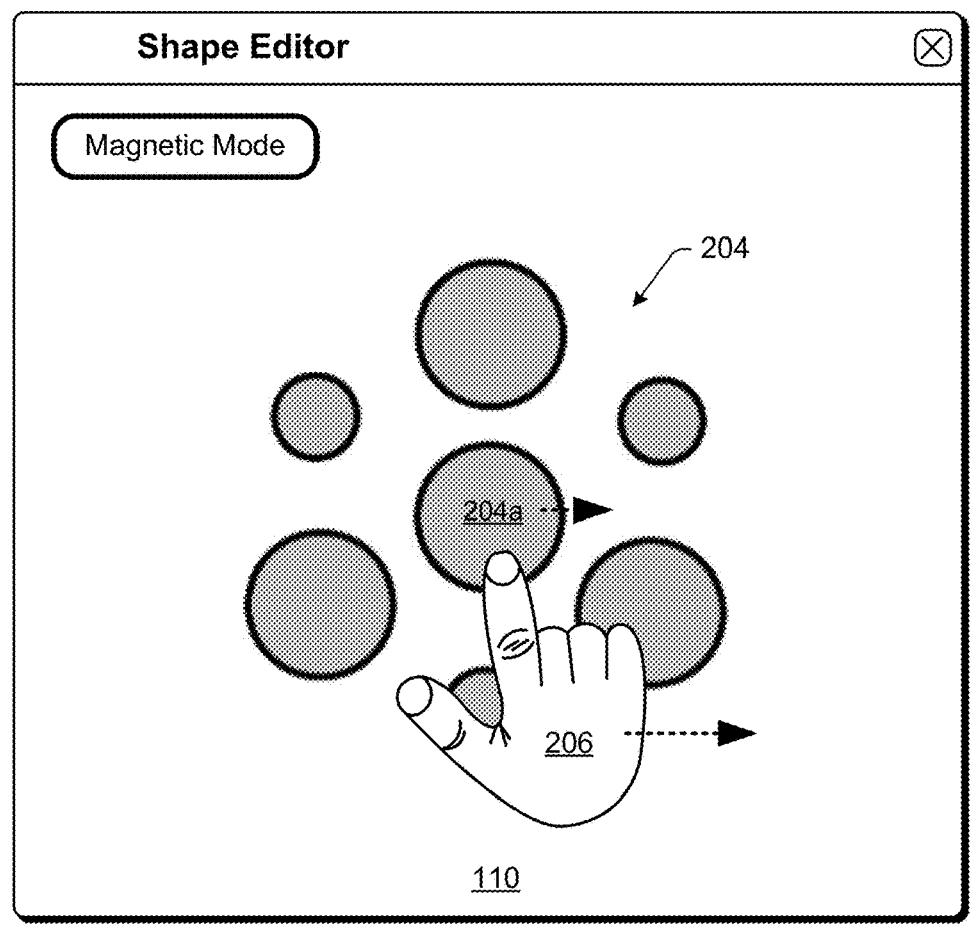
FIG. 3 depicts an example scenario for initiating a shape join operation.

FIG. 3 depicts an example scenario 300 for initiating a shape join operation. The scenario 300, for instance, represents a continuation of the scenario 200, with the proximity join mode being active. In the scenario 300, a user manipulates a shape 204a using their hand 206, such as by dragging the shape 204a within the editor GUI 110. Accordingly, in the proximity mode, a proximity analysis is performed to determine a proximity of the shape 204a to others of the shapes 204, such as to determine whether to initiate a shape join operation between the shape 204a and one or more others of the shapes 204. In at least one implementation, manipulating the shape 204a causes the shape 204a to be designated as a "source shape" such that proximity between the source shape and others of the shapes 204 is utilized to determine whether and how to initiate a shape join operation.

Figure 4:
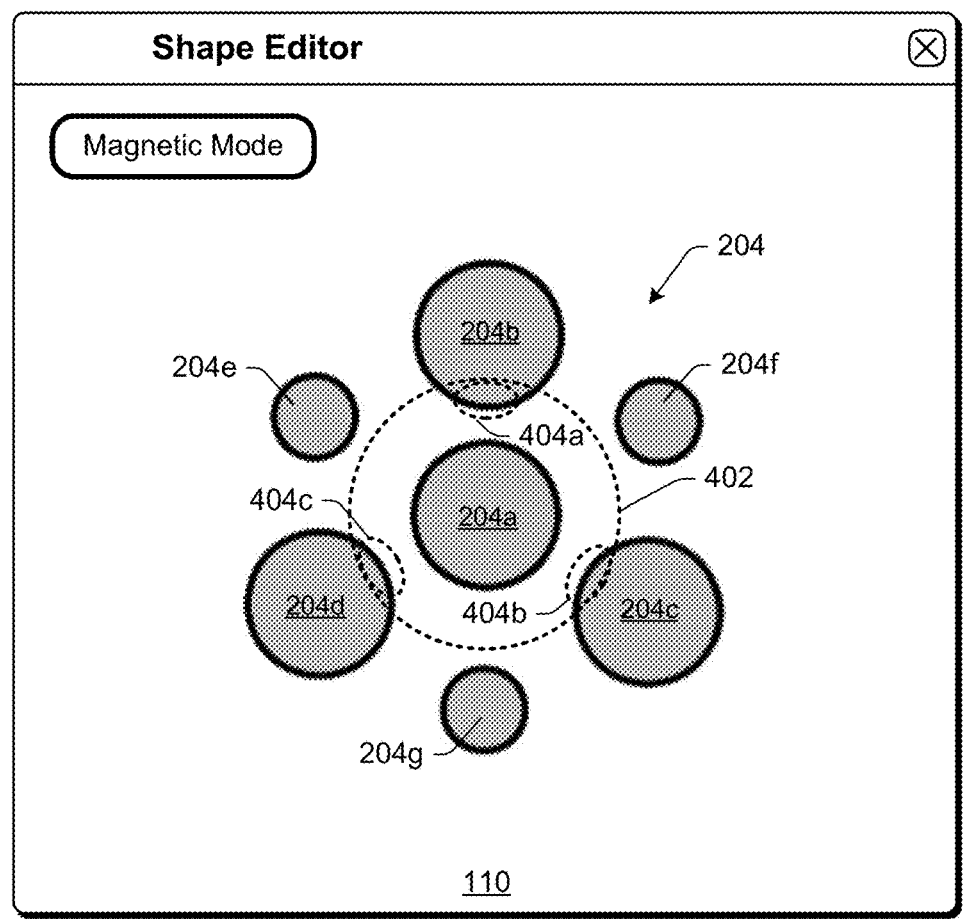
FIG. 4 depicts an example scenario for determining a proximity between shapes for a shape join operation.

FIG. 4 depicts an example scenario 400 for determining a proximity between shapes for a shape join operation. The scenario 400, for instance, represents a continuation of the scenarios 200, 300. In the scenario 400 and based on the manipulation of the shape 204a described above, the shape editor module 108 determines whether any surrounding shapes are within a proximity region 402 to the shape 204a. Generally, the proximity region 402 can be defined in various ways, such as based on a uniform distance from a visual perimeter of the shape 204a. For instance, the proximity region 402 is of the same shape as the shape 204a and radiates a defined distance outwardly from the perimeter of the shape 204a. This is not intended to be limiting, however, and the shape and size of the proximity region 402 can be customized, such as by user input. Further, in an additional or alternative implementation, the proximity region 402 can be shaped differently than the shape 204a, such as in response to user input to customize the shape and/or size of the proximity region 402. Generally, the proximity region 402 represents a logical region that at least in some implementations, is not visually represented. This is not intended to be limiting, however, and some implementations may utilize a visual representation of the proximity region, such as some form of visual cue of a size and/or boundary of the proximity region 402.

Further to the scenario 400, the shape editor module 108 determines that shapes 204b, 204c, 204d are in contact with the proximity region 402, e.g., the proximity region 402 at least partially overlaps the shapes 204b-204d. Generally, when multiple shapes are detected in contact with the proximity region 402, the shape editor module 108 determines which shape is closest to the perimeter of the source shape 204a and marks that shape to be joined to the shape 204a. In at least some implementations, even though multiple shapes are in contact with the proximity region 204a, only the closest shape to the shape 204a is joined to the shape 204a. However, if multiple shapes are in contact with the proximity region 402 and are approximately the same distance from the perimeter of the shape 204a such as based on a defined distance threshold (e.g., in terms of pixel distance and/or other distance measurement unit), the multiple shapes may be joined to the shape 204a.

In this particular example, the proximity region 402 contacts the shapes 204b-204d at contact regions 404a, 404b, 404c, respectively, and the shapes 204b-204d are all within same threshold distance from the periphery of the shape 204a. The threshold distance, for instance, is +/−x pixels, +/−y millimeters, etc. Accordingly, a shape join operation is initiated to join the shape 204a to the shapes 204b-204d, in this particular example at the contact regions 404a-404c. Notice also that others of the shapes 204, e.g., shapes 204e, 204f, 204g, are outside of the proximity region 402, and thus are not included in the shape join operation to the shape 204a.

Figure 5:
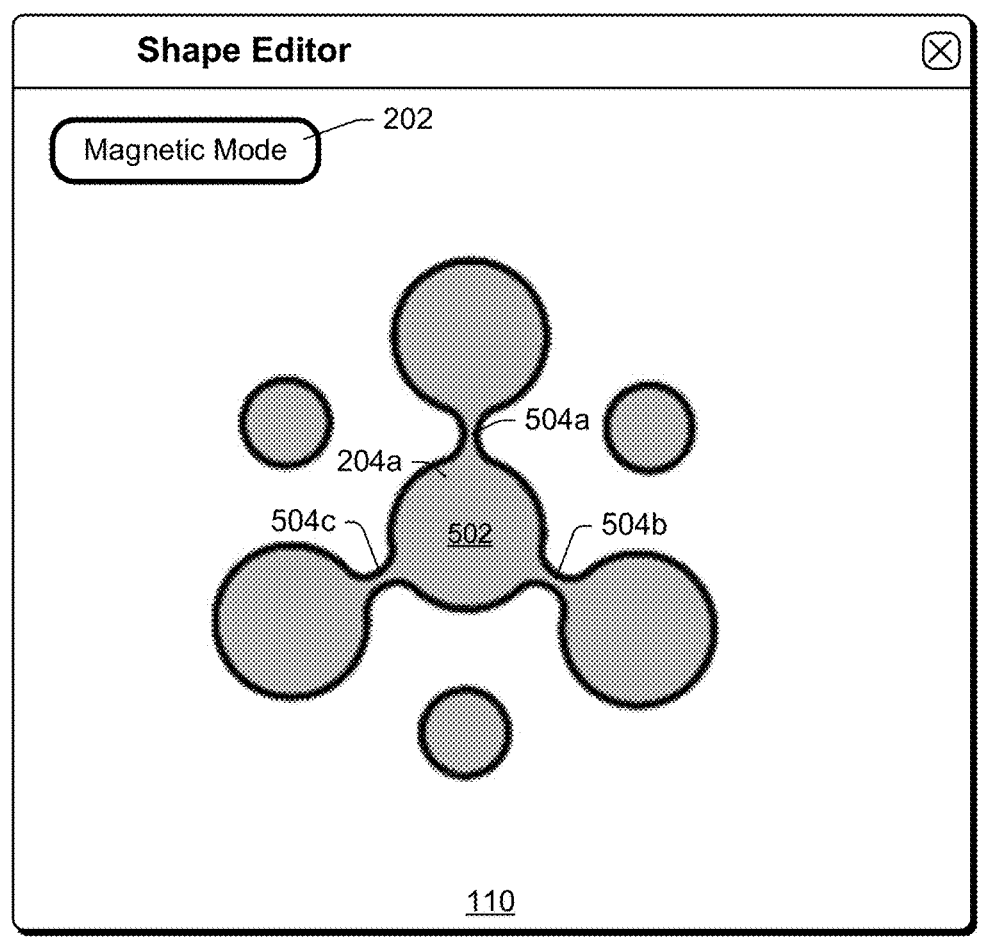
FIG. 5 depicts an example scenario for joining shapes based on a shape join operation.

FIG. 5 depicts an example scenario 500 for joining shapes based on a shape join operation. The scenario 500, for instance, represents a continuation of the scenarios 200-400. In the scenario 500, in response to determining that the shapes 204b-204d are in contact with the proximity region 402, the shapes 204b-204d are joined to the shape 204a to generate a joined shape 502. Generally, as part of joining the shapes 204a-204d, the perimeters of the shapes 204a-204d are perforated (e.g., cut and opened) at specified points and joined together to form an integrated joined shape 502. In this particular example, the joined shape 502 has a single continuous perimeter that includes portions of the perimeters of the respective shapes 204a-204d as joined to each other via join regions 504a, 504b, 504c. The following scenarios now depict example details about how shape join operations are implemented, such as the shape join operation described above.

In at least some implementations, while the proximity join mode is active, a user may manipulate different portions of the joined shape 502 to modify the geometry of the joined shape. For instance, a user may drag the source shape 204a away from one of the other shapes 204b-204d to disconnect the shape 204a from the shape. Generally, a separate disconnect threshold distance can be defined, such as based on a fraction or multiple of the distance of the proximity region 402. Implementations may also enable a joined shape to be locked as a single shape such that the joined shape can be moved as a single integrated shape throughout the editor GUI 110. For instance, a user may deselect the join mode control 202 to deactivate the proximity join mode, which may cause the joined shape 502 to be locked together as a single shape such that manipulating (e.g., dragging) portions of the shape causes the entire joined shape 502 to move together.

Figure 6:
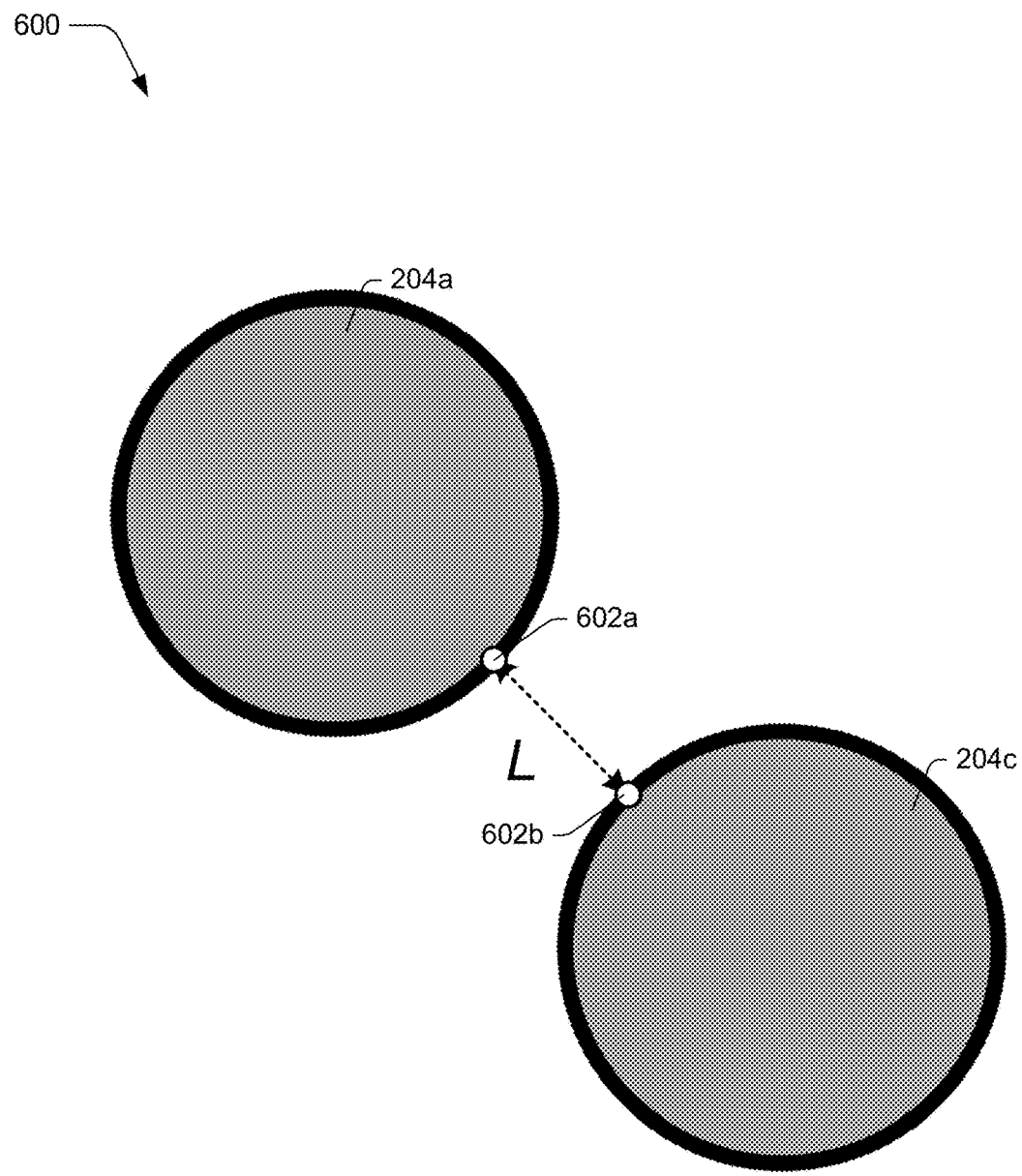
FIG. 6 depicts a scenario for determining where to join two shapes as part of a shape join operation.

FIG. 6 depicts a scenario 600 for determining where to join two shapes as part of a shape join operation. The scenario 600, for instance, includes the shapes 204a and 204c included as part of the shape join operation described above. As part of the determining where to join the shapes 204a, 204c, the closest points between the two shapes are determined. In this example, the shortest distance between the perimeters of the shapes 204a, 204c is between a point 602a on the perimeter of shape 204a and a point 602b on the perimeter of shape 204c. These two points are joined by a line L, which generally represents a central axis of a join region to be used to join the shapes 204a, 204c.

Figure 7:
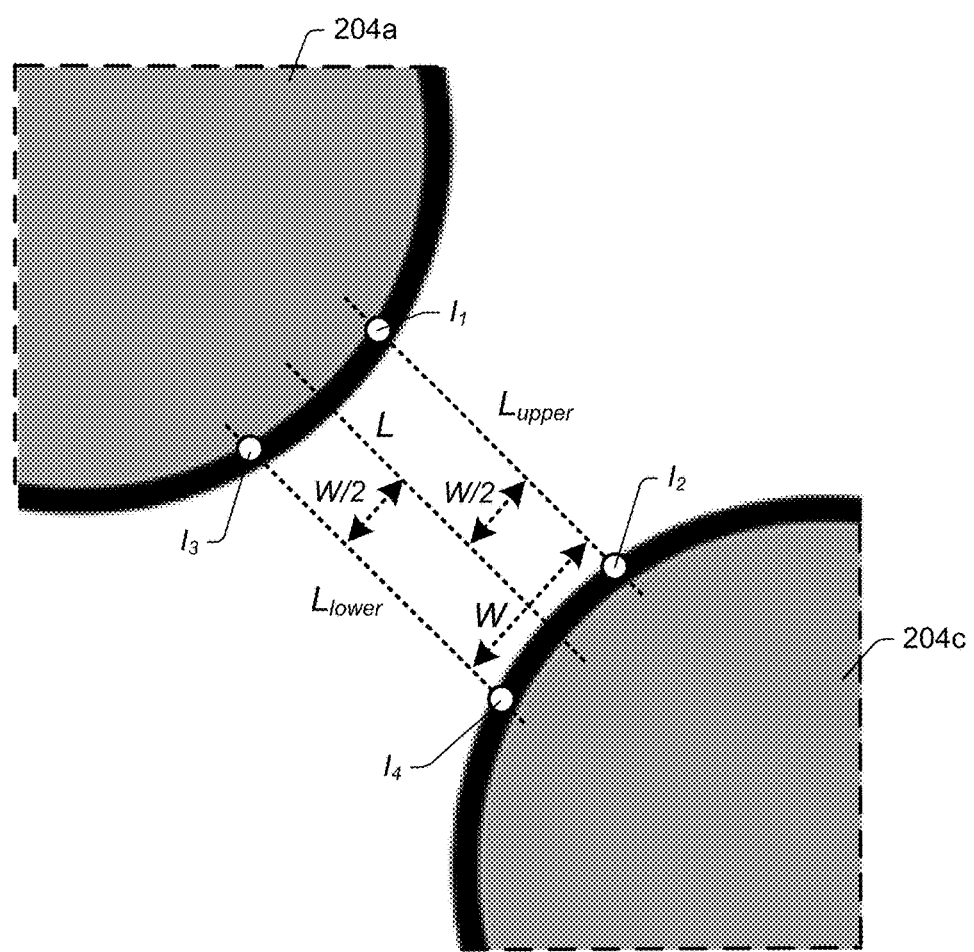
FIG. 7 depicts an example scenario for determining a geometry and placement of a join region as part of a shape join operation.

FIG. 7 depicts an example scenario 700 for determining a geometry and placement of a join region as part of a shape join operation. The scenario 700 includes cutaway portions of the shapes 204a, 204c and the line L between the two shapes, introduced above. A width W of a join region between the two shapes is determined. Generally, W can be determined by any arbitrary metric, such as the length of L. For instance, W can be calculated as a multiple or fraction of the length of L, such as ½L. To determine where to perforate the perimeters of the shapes 204a, 204c, two logical lines $L_{upper}$ and $L_{lower}$ are created parallel to L. In at least one implementation, $L_{upper}$ and $L_{lower}$ are spaced equidistant from L, such as at a distance of W/2.

Next, intersection points between $L_{upper}$ and $L_{lower}$ and the perimeters of the shapes 204a, 204c are identified, which in this example include intersection points $I_1$, $I_2$, $I_3$, and $I_4$. Generally, when identifying such intersection points, if multiple possible intersection points are identified for a specific intersection of $L_{upper}$ and $L_{lower}$ and a particular shape, the nearest pair of intersection points are selected. Thus, as described below, the points $I_1$, $I_2$, $I_3$, and $I_4$ can be utilized to join the shapes 204a, 204c.

Figure 8:
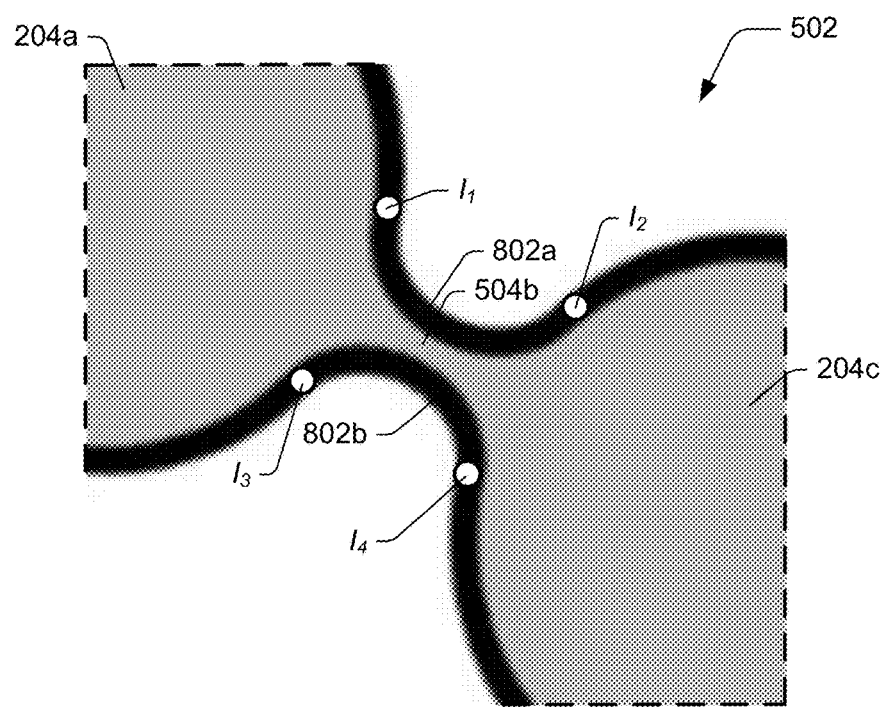
FIG. 8 depicts an example scenario for joining shapes as part of a shape join operation.

FIG. 8 depicts an example scenario 800 for joining shapes as part of a shape join operation. In the scenario 800, the perimeters of the shapes 204a, 204c are perforated at their respective intersection points I and joined by attaching curves between the intersection points. For instance, a curve 802a is attached between the intersection points $I_1$, $I_2$, and a curve 802b is attached between the intersection points $I_3$, $I_4$. Generally, the curves 802a, 802b represent respective perimeters of the join region 504b and form the join region 504b between the shapes 204a, 204c. Notice also that as part of joining the shapes 204a, 204c, a fill color and/or fill pattern from the shapes 204a, 204c is used to fill an interior of the join region 504b between the curves 802a, 802b.

Alternatively or in addition, fill attributes (e.g., color, shading, and/or pattern) of a join region can be specified for different fill scenarios. For instance, consider an implementation where the original shapes 204a, 204c have differing fill attributes. In such an implementation, the fill attributes of the source shape 204a can be used to fill the entire joined shape, e.g., the joined shape 502. Alternatively, fill attributes of the target shape 204c can be used to fill the joined shape 502. As yet another implementation, a fill attribute gradient can be used to transition from the source shape 204a to the target shape 204c, e.g., within and across the join region 504b. Generally, different fill behaviors for filling a joined shape can be specified via default settings of the shape editor module 108, and/or via user customization.

Figure 9:
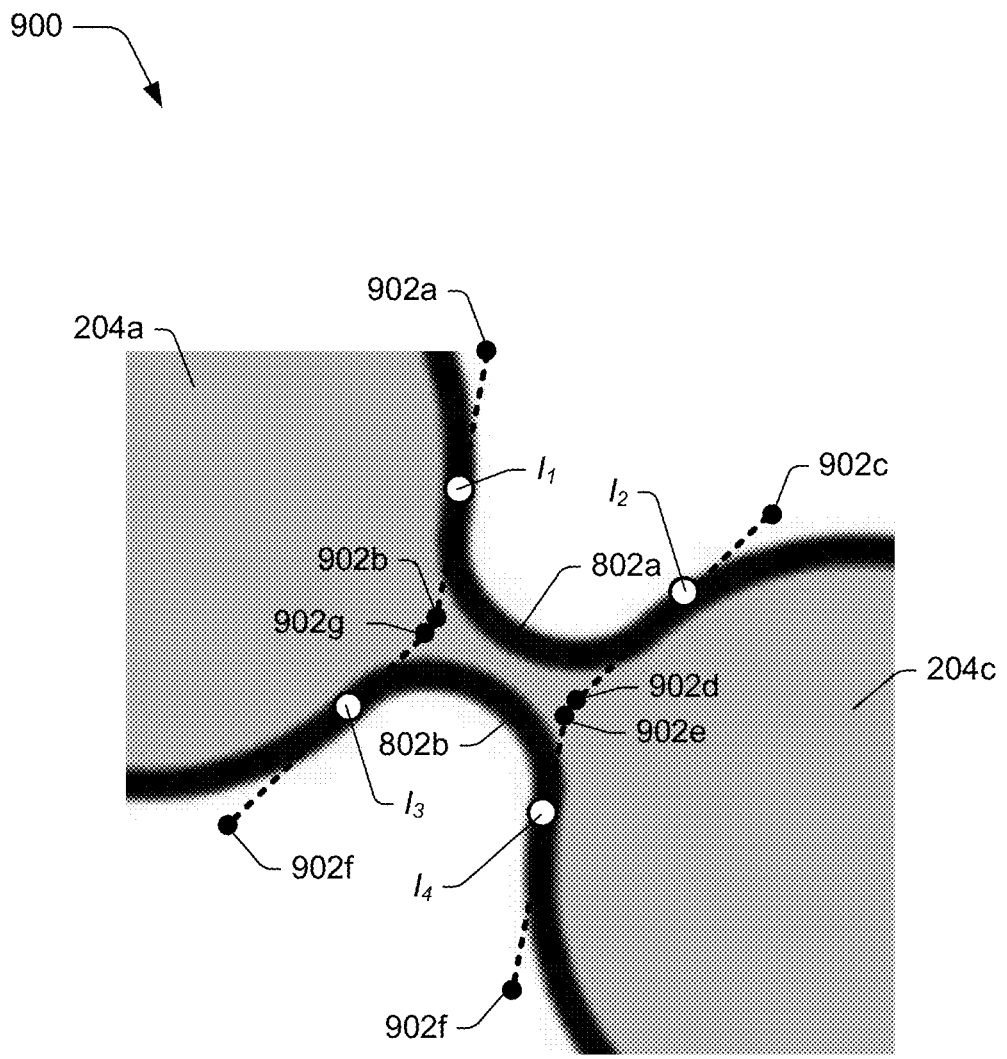
FIG. 9 depicts an example scenario that illustrates an example placement of control points relative to curves of a join region.

In at least one implementation, the curves 802a, 802b represent Bézier curves. For instance, the curve 802a represents a Bézier curve with its endpoints coincident with the intersection points $I_1$, $I_2$, and the curve 802b represents a Bézier curve with its endpoints coincident with intersection points $I_3$, $I_4$. In implementations that utilize Bézier curves, placement of the curves' endpoints coincident with the respective intersection points enables C0 continuity of the curves in relation to the joined shape 502. Further, to enable C1 continuity of the curves 802a, 802b, control points can be placed on the curves based on a specific geometry. For instance, FIG. 9 depicts an example scenario 900 that illustrates an example placement of control points relative to the curves 802a, 802b. The scenario 900 illustrates control points 902 including control points 902a, 902b, 902c, 902d, 902e, 902f, 902g, and 902h. To illustrate how C1 continuity is maintained for the curve 802a, the control point 902b is placed along a colinear line segment that passes through intersection point $I_1$ and coincides with the control point 902a previous to the $I_1$ on the shape 204a. Further, the control point 902d is placed along a colinear line segment that passes through intersection point $I_2$ and coincides with the control point 902c previous to $I_2$ on the shape 204c. A similar control point placement is utilized for placing the control points 902e, 902g for the curve 802b. Accordingly, the described techniques enable C1 continuity to be maintained as part of a shape join operation.

Generally, the join region 504b can be edited via user input to the respective control points 902. For instance, a user can interact with the control points 902b, 902d to edit a geometry (e.g., curvature) of the curve 802a. Further, a user can interact with the control points 902e, 902g to edit a geometry of the curve 802b.

Figure 10:
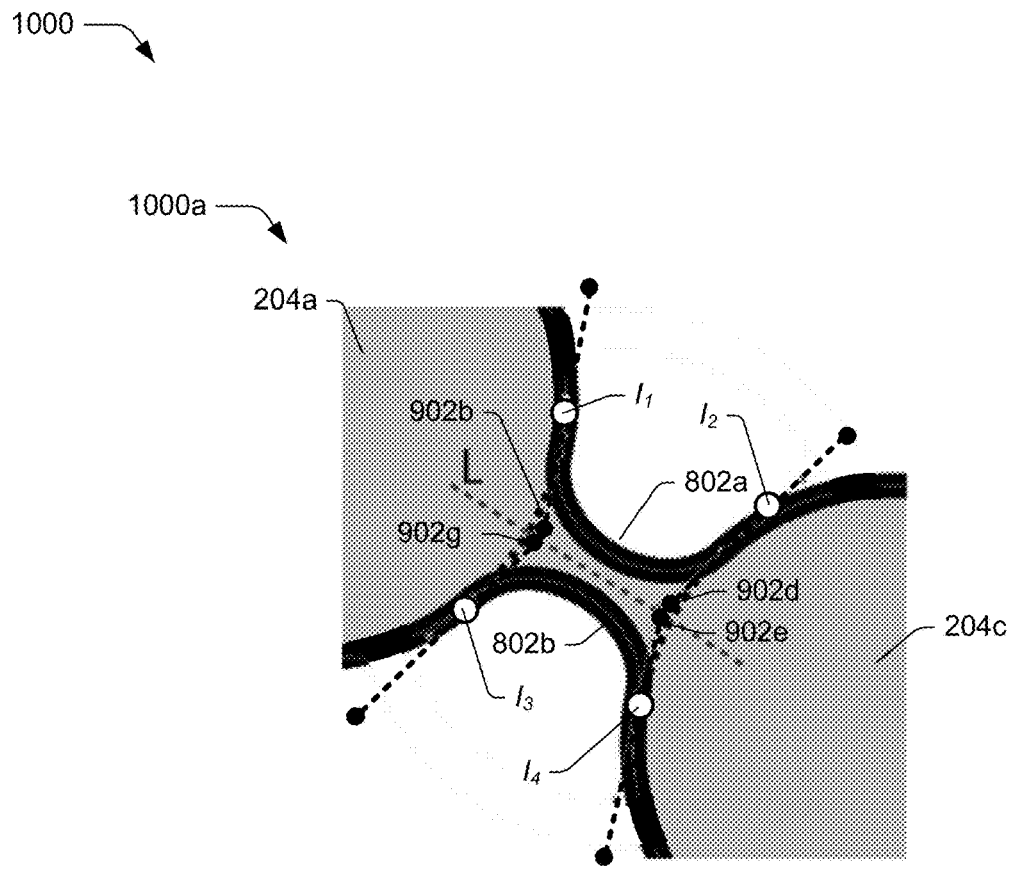
FIG. 10 depicts an example scenario that describes how placement of control points is managed to avoid undesirable geometries and visual arrangements.
Figure 10:
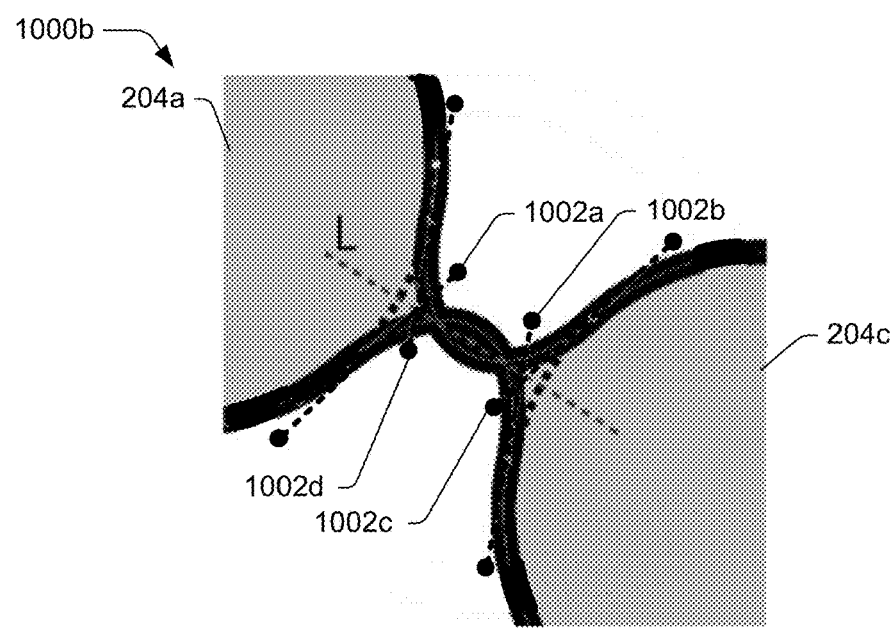

FIG. 10 depicts an example scenario 1000 that describes how placement of control points is managed to avoid undesirable geometries and visual arrangements. At 1000a, notice that the control points 902b, 902d, 902e, and 902g are placed such that they do not cross the line L relative to the respective curves 802a, 802b. In at least one implementation, this is done by specifying that the distance of the control points from their respective intersection points I is limited such that the control points cannot extend beyond L.

In contrast, 1000b depicts an implementation that does not utilize the techniques described herein for managing placement of control points. Notice that at 1000b, a set of control points 1002 including control points 1002a, 1002b, 1002c, and 1002d are positioned such that they extend across the line L. In such an implementation, the control points 1002 can be manipulated to alter a curvature of the curves created between the shapes 204a, 204c such that the curves cross each other, as depicted at 1000b. In at least some implementations, this represented an undesired geometry and visual arrangement of a joined shape.

Figure 11:
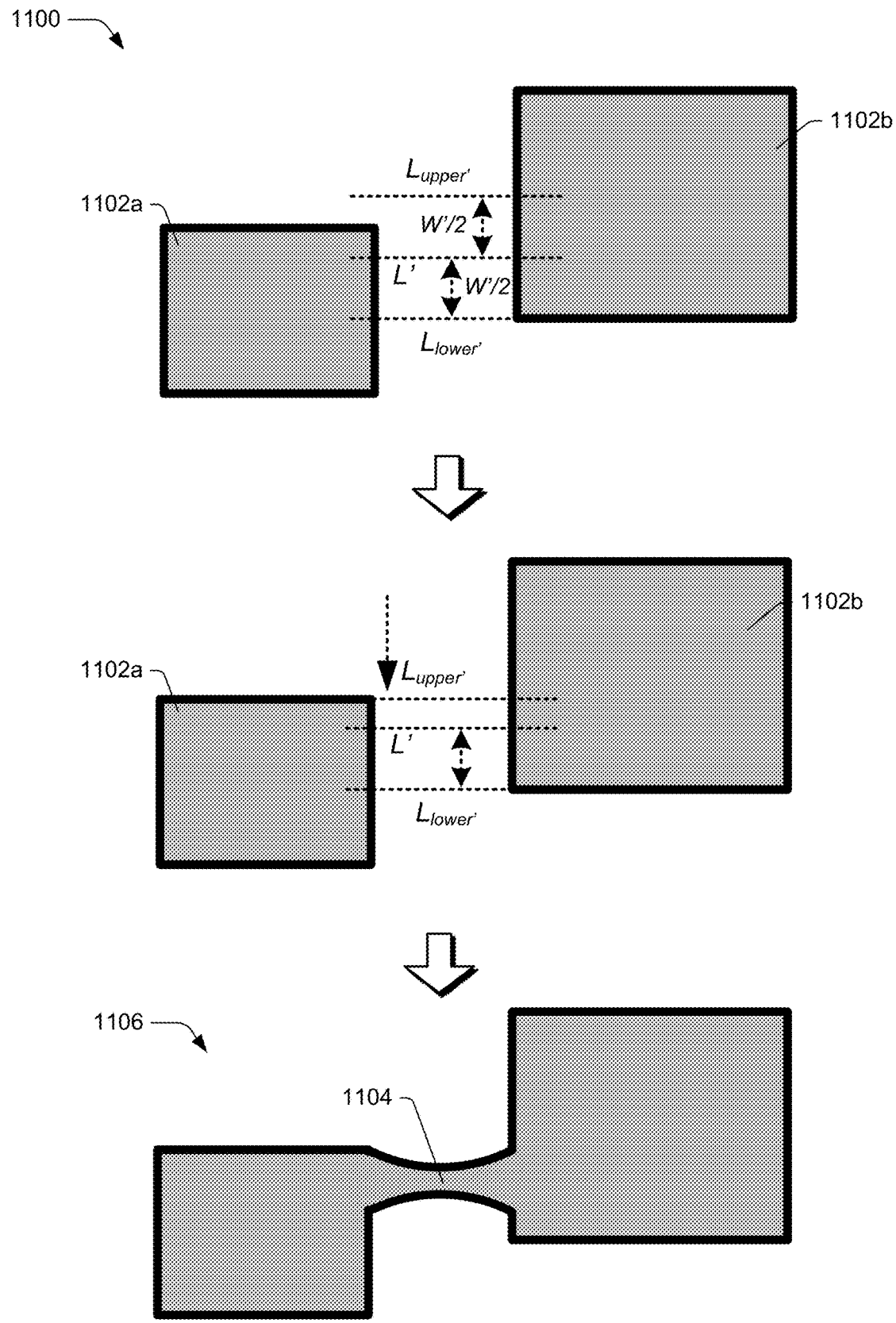
FIG. 11 depicts an example scenario illustrating that the width of a join region can be constrained to avoid undesired geometries.

FIG. 11 depicts an example scenario 1100 illustrating that the width of a join region can be constrained to avoid undesired geometries. In the upper portion of the scenario 1100, a shape join operation is initiated between a shape 1102a and a shape 1102b. Initially, to define a join region between the shapes 1102a, 1102b, a line L' is defined between the shapes, which represents a central axis of a join region between the shapes. Further, lines $L_{upper'}$ and $L_{lower'}$ are defined on either side of L', which represent an outer bound of a join region based on a width W' for the join region. The respective distances between $L_{upper'}$ and $L_{lower'}$ from L', for instance, are W'/2. Notice that in this example, an initial calculation of the position of $L_{upper'}$ places $L_{upper'}$ where it does not intersect with the shape 1102a. In at least one implementation, this represents an undesirable geometry since an upper bound of any resulting join region would not intersect the shape 1102a. Accordingly, as depicted in the center portion of the scenario 1100, techniques described herein adjust the join region geometry by adjusting the position of $L_{upper'}$ to the furthest position above L' that will allow $L_{upper'}$ to still intersect the shape 1102a. At the lower portion of the scenario 1100, a join region 1104 is generated to join the shapes 1102a, 1102b and based on the adjusted position of $L_{upper'}$ to generate a joined shape 1106. Generally, the various details described above for generating and positioning a join region can apply to generating the join region 1106.

Figure 12:
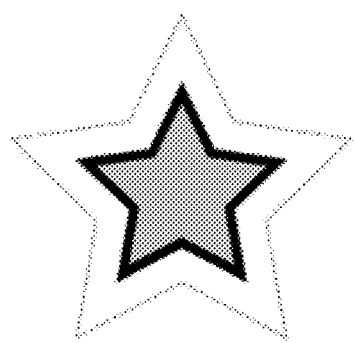
FIG. 12 depicts an example scenario illustrating that a variety of different shape geometries can be utilized to join shapes using the techniques described herein.
Figure 12:
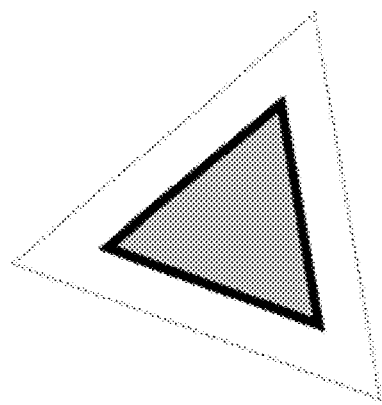
Figure 12:
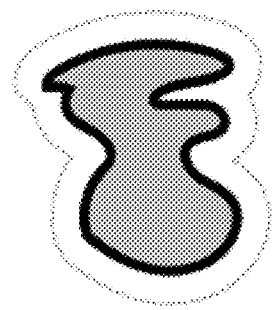

FIG. 12 depicts an example scenario 1200 illustrating that a variety of different shape geometries can be utilized to join shapes using the techniques described herein. The scenario 1200, for instance, includes a set of shapes 1202 that includes shapes of different geometries, including at least one shape with a complex, irregular geometry. Each of the shapes 1202 is surrounded by a dotted line, identifying a proximity region for each respective shape. As described previously, the proximity regions extend outwardly from the perimeters of the respective shapes and are shaped generally the same as their respective shapes. Thus, the described techniques can be employed to join different shapes of a variety of different geometries.

Figure 13:
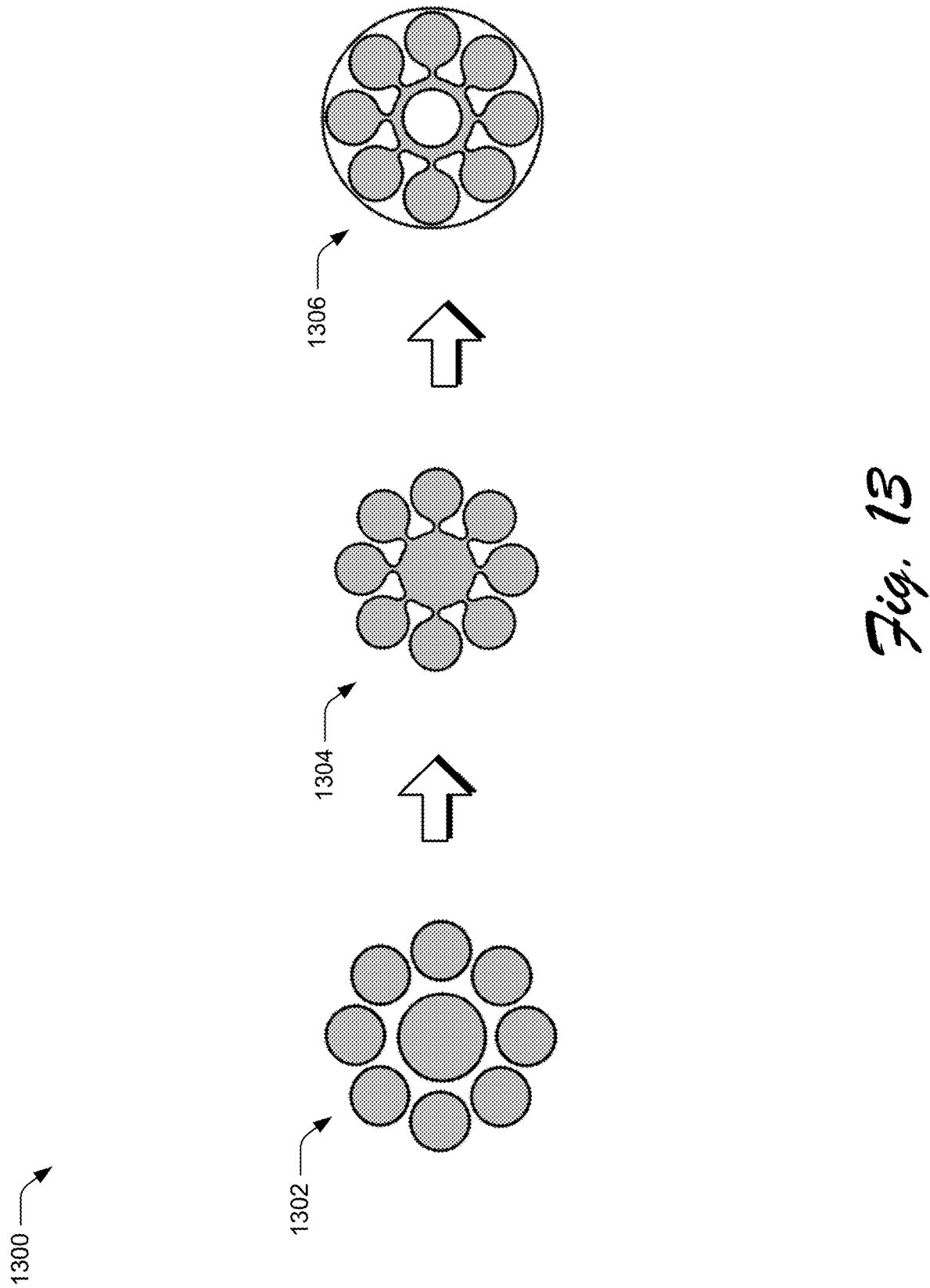
FIG. 13 depicts an example scenario for generating a joined shape and editing the joined shape.
Figure 14:
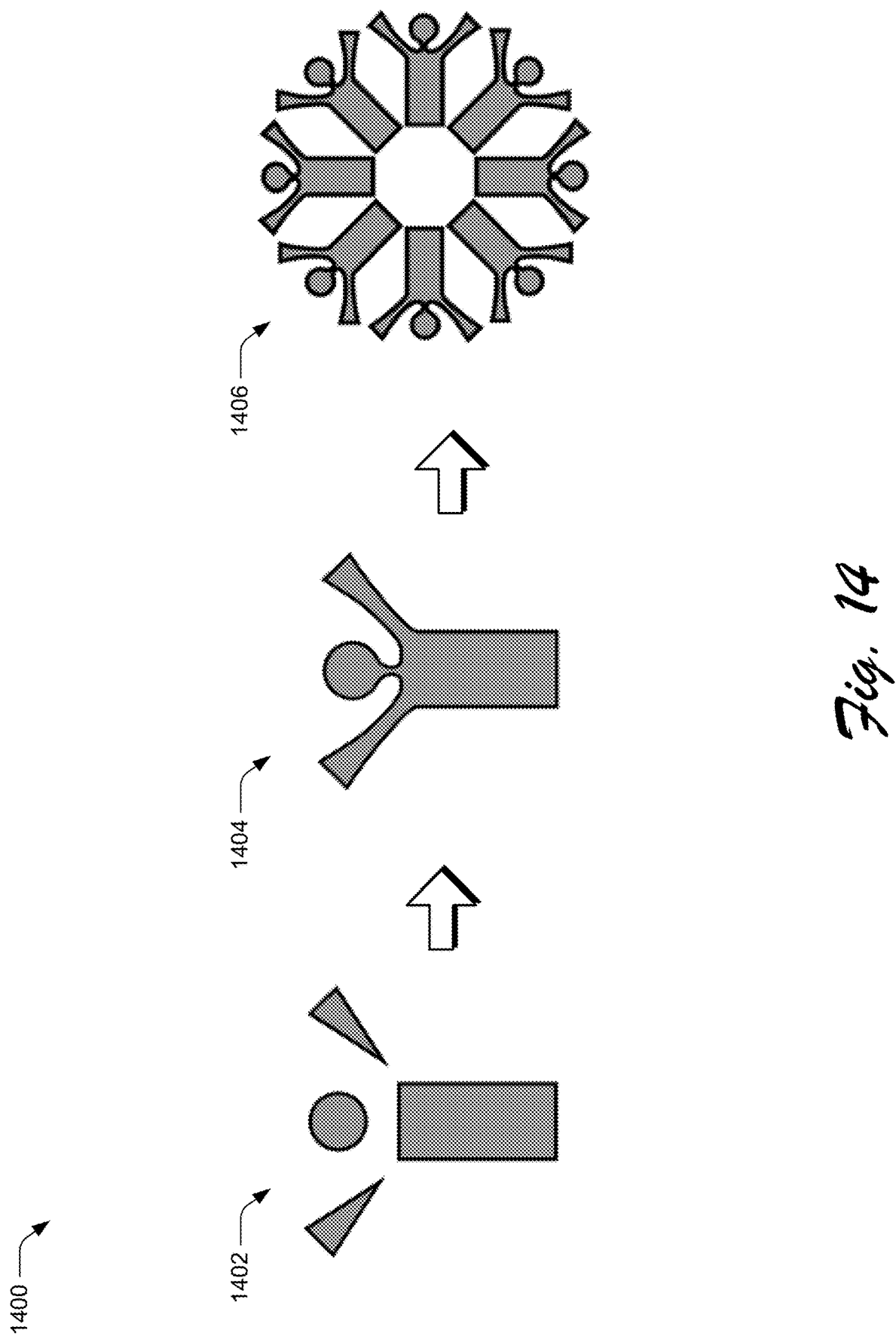
FIG. 14 depicts an example scenario for generating a joined shape and editing the joined shape.

FIGS. 13 and 14 depict some scenarios for shape editing that may be utilized in conjunction with and/or as extensions of techniques for shape joining based on proximity. These scenarios, however, are not to be construed as limiting on implementations for shape joining based on proximity. FIG. 13 depicts an example scenario 1300 for generating a joined shape and editing the joined shape. The scenario 1300 includes a set of shapes 1302 that are joined utilizing a shape join operation as described herein to generate a joined shape 1304. Beautification editing is then applied to the joined shape 1304 to generate a beautified joined shape 1306. The beautification editing, for instance, includes adding other shapes in proximity to the joined shape 1304, such as a central and surrounding circle as depicted in the scenario 1300.

FIG. 14 depicts an example scenario 1400 for generating a joined shape and editing the joined shape. The scenario 1400 includes a set of shapes 1402 that are joined utilizing a shape join operation as described herein to generate a joined shape 1404. Geometric editing is then applied to the joined shape 1404 to generate an edited joined shape 1406. The geometric editing, for instance, includes performing a radial repeat operation on the joined shape 1404 to generate multiple radial copies of the joined shape 1406 and generate the edited shape 1406.

Figure 15:
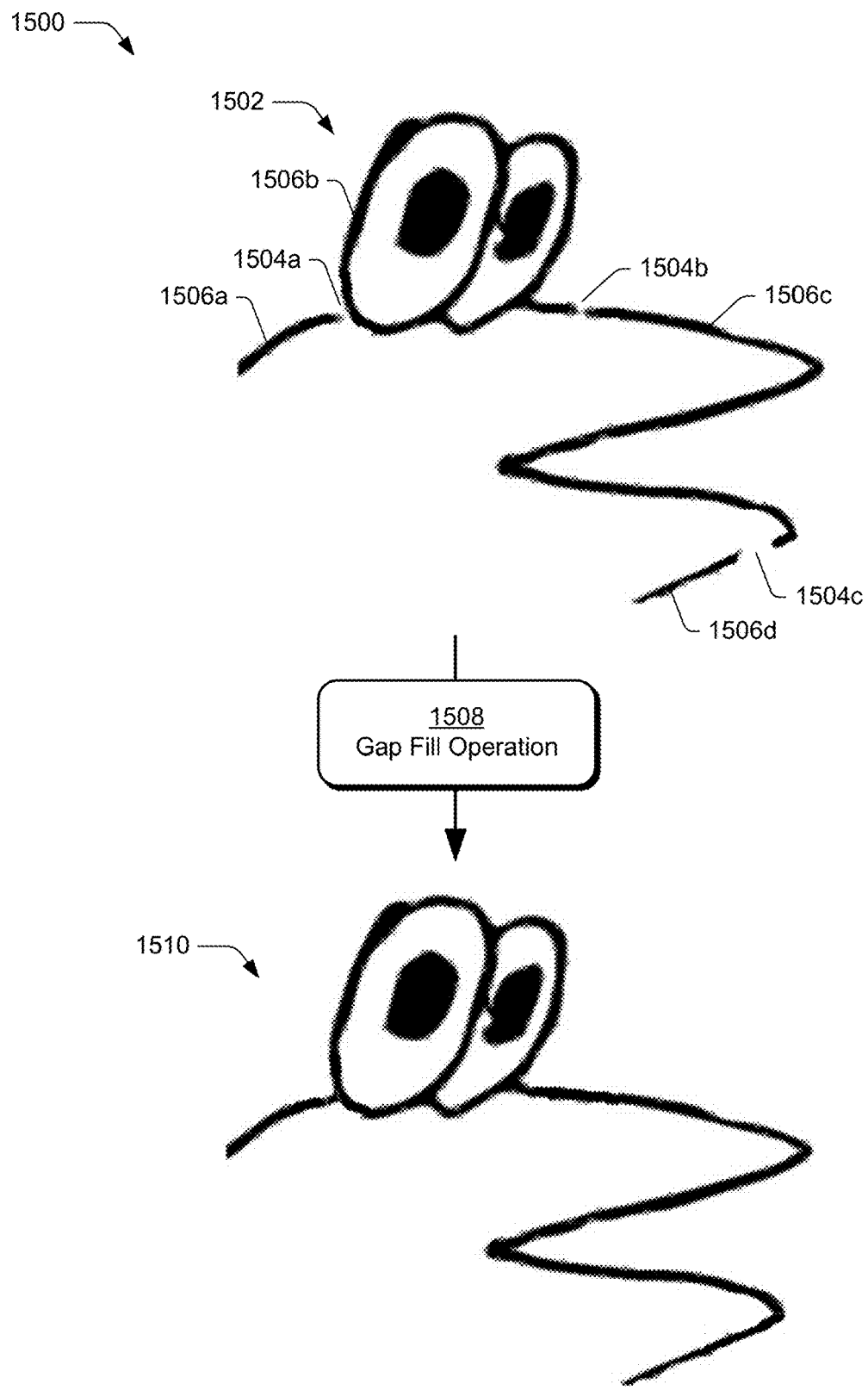
FIG. 15 depicts an example scenario for utilizing techniques for shape joining based on proximity to fill gaps in images.

FIG. 15 depicts an example scenario 1500 for utilizing techniques for shape joining based on proximity to fill gaps in images. The upper portion of the scenario 1500 includes an initial image 1502 that includes gaps 1504a, 1504b, and 1504c between different sections 1506a, 1506b, 1506c, and 1506d (e.g., curves) of the initial image 1502. In at least one implementation, the initial image 1502 represents a vectorized image. The initial image 1502, for instance, is generated by vectorizing a raster image. Thus, the gaps 1504 may be introduced as artifacts caused by the vectorization process.

Proceeding to the lower portion of the scenario 1500, a gap fill operation 1508 is performed to fill the gaps 1504 between the sections 1506 and generate a filled image 1510. Generally, the gap fill operation 1508 includes aspects of a shape join operation, such as described above. For instance, a user can activate the proximity join mode, such as described above. While the proximity join mode is active, the user can select and/or drag one or more of the sections 1506, which causes the shape editor module 108 to detect the gaps 1504 and initiate a shape join operation between the sections 1506 to fill the gaps 1504 with solid lines. Alternatively or additionally, the user can select the gaps 1504, which the shape editor module 108 can interpret as an instruction to fill the gaps 1504. Accordingly, the described techniques can be utilized to perform image correction, such as gap filling in sections of an image.

Having discussed some implementation details, consider now some example methods for shape joining based on proximity.

Figure 16:
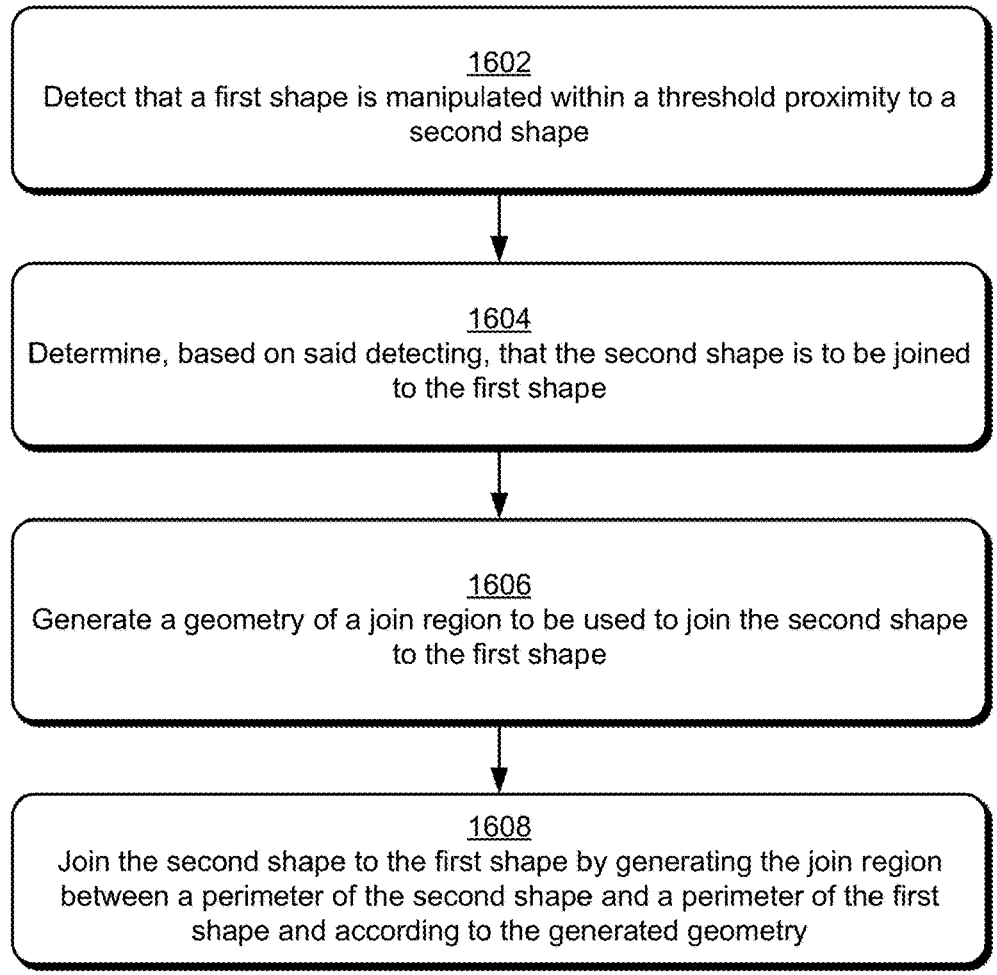
FIG. 16 depicts an example procedure for joining shapes.

FIG. 16 depicts an example method 1600 for joining shapes. For instance, the method is performed by the shape editor module 108 while a shape proximity join mode is active.

Step 1602 detects that a first shape is manipulated within a threshold proximity to a second shape. A user, for instance, manipulates the first shape such that a defined proximity region for the first shape contacts and/or overlaps a perimeter of the second shape. Accordingly, the proximity module 126 detects that the second shape is within a threshold proximity to the first shape.

Step 1604 determines, based on said detecting, that the second shape is to be joined to the first shape. For instance, a proximity join mode is active, and thus the shape selection module 130 indicates that the second shape is to be joined to the first shape.

Step 1606 generates a geometry of a join region to be used to join the second shape to the first shape. The join geometry module 134, for example, determines where a join region is to be attached to the first shape and the second shape, as well as dimensions of the join region. In implementations that involve curved boundaries for the join region, the join geometry module 134 can calculate curvature for the curves. Further, the join geometry module 134 determines where the first shape and the second shape are to be connected to the join region, such as where the perimeters of the first shape and the second shape are to be perforated and attached to the join region. Detailed aspects for calculating join region geometries are provided above.

Step 1608 joins the second shape to the first shape by generating the join region between a perimeter of the second shape and a perimeter of the first shape and according to the generated geometry. The join module 140, for instance, generates (e.g., visually renders) the join region and attaches the join region to the first shape and the second shape to generate a joined shape. In at least some implementations, joining shapes includes perforating (e.g., cutting) the shapes at specified attachment regions and attaching a join region at the attachment regions. Further, by attaching the shapes using the join region, at least some implementations generate the joined shape as a single shape with a single continuous perimeter.

Generally, the various data generated to join different shapes is saved and can be referenced to edit a joined shape after the joined shape is generated. Further, the data describing the various steps in a join process can be serialized such that the join process can be replayed at a subsequent point to visualize how the join process was implemented, and to enable users to adjust a source shape and/or a join region between a source shape and a target shape.

Figure 17:
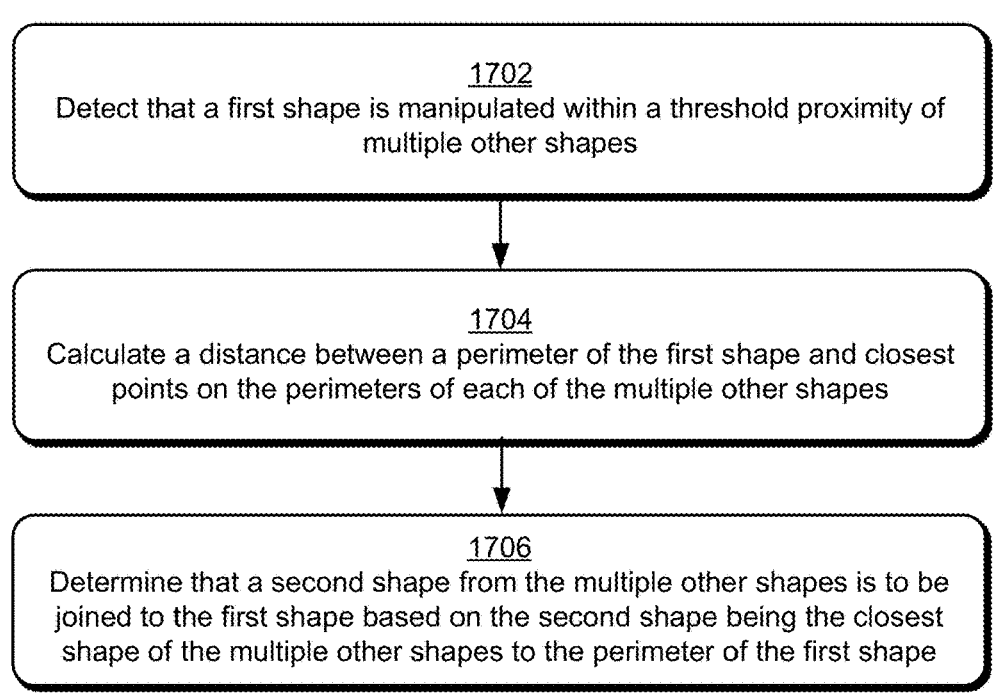
FIG. 17 depicts an example procedure for joining shapes when multiple shape join candidates are available.

FIG. 17 depicts an example method 1700 for joining shapes when multiple shape join candidates are available. For instance, the method is performed by the shape editor module 108 while a shape proximity join mode is active and in conjunction with the method 1600 to identify which of multiple available shapes to utilize for a shape join operation.

Step 1702 detects that a first shape is manipulated to within a threshold proximity of multiple other shapes. The proximity module 126, for instance, detects that multiple other shapes are in contact with and/or overlapping a defined proximity region of the first shape.

Step 1704 calculates a distance between a perimeter of the first shape and closest points on the perimeters of each of the multiple other shapes. For example, for each of the multiple other shapes, the proximity module 126 calculates the length of a shortest line between the perimeter of the first shape and a perimeter of a respective shape of the multiple other shapes.

Step 1706 determines that a second shape from the multiple other shapes is to be joined to the first shape based on the second shape being the closest shape of the multiple other shapes to the perimeter of the first shape. The shape selection module 130, for instance, determines that for all of the multiple other shapes, the perimeter of the second shape is the closest to the perimeter of the first shape. Thus, the second shape can be joined to the first shape, such as described above. Further, others of the multiple other shapes that are a further distance from the first shape may not be joined to the first shape.

Figure 18:
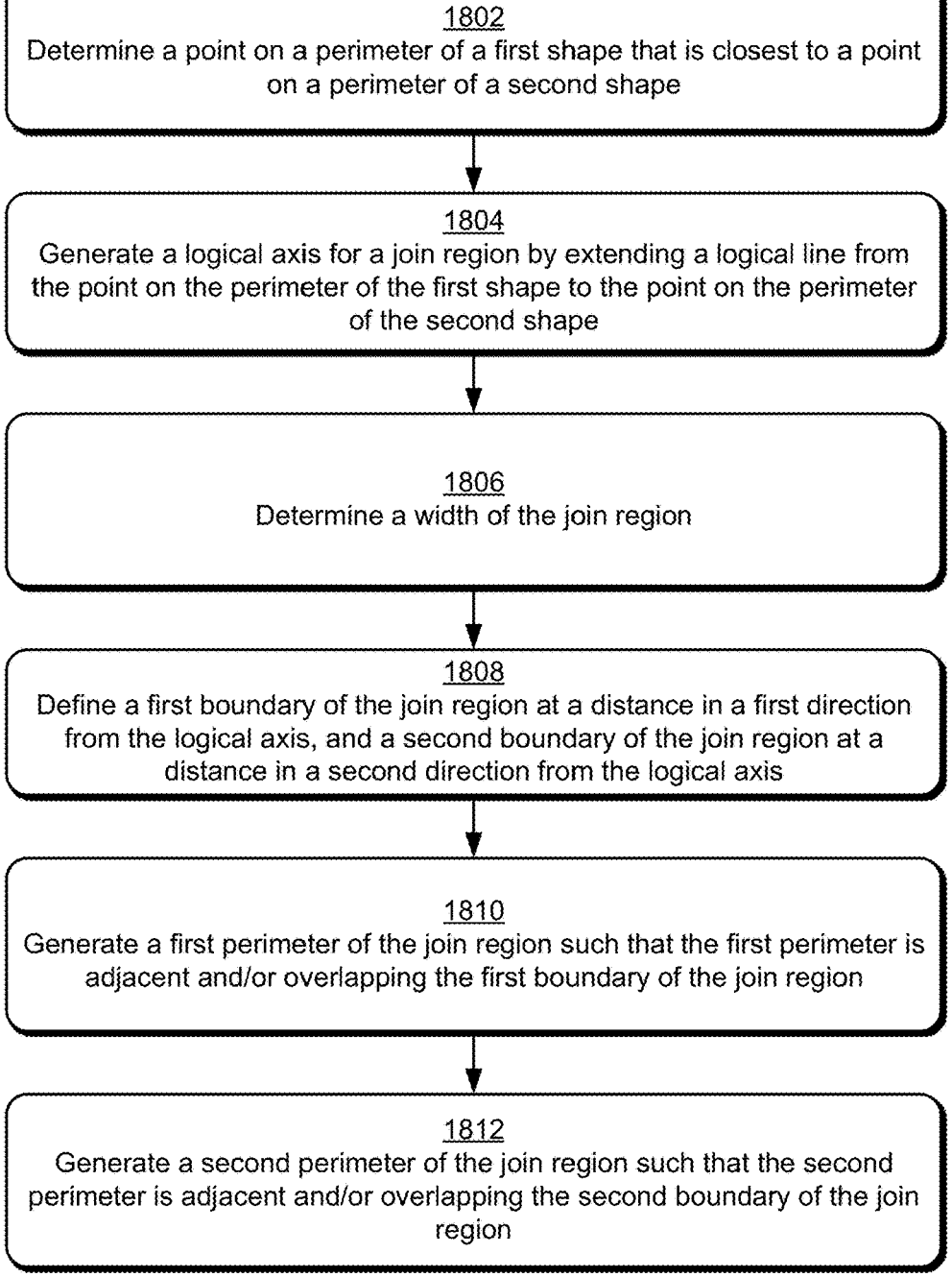
FIG. 18 depicts an example procedure for generating a join region for joining shapes.

FIG. 18 depicts an example method 1800 for generating a join region for joining shapes. For instance, the method is performed by the shape editor module 108 as part of a shape join operation, such as in conjunction with the method 1600. Generally, the method may be performed in different ways, such as via cooperative execution of the join geometry module 134 and the join module 140.

Step 1802 determines a point on a perimeter of a first shape that is closest to a point on a perimeter of a second shape. The second shape, for instance, represents a shape that is identified to be joined to the first shape, such as described above.

Step 1804 generates a logical axis for a join region by extending a logical line from the point on the perimeter of the first shape to the point on the perimeter of the second shape.

Step 1806 determines a width of the join region. Generally, the join geometry module 134 can determine the width in various ways, such as a fraction or multiple of the logical axis.

Step 1808 defines a first boundary of the join region at a distance in a first direction from the logical axis, and a second boundary of the join region at a distance in a second direction from the logical axis. In at least one implementation, the distance used to define the first boundary and the second boundary is a fraction or multiple of the width of the join region, such as one half the width of the join region.

Step 1810 generates a first perimeter of the join region such that the first perimeter is adjacent and/or overlapping the first boundary of the join region. The join module 140, for instance, generates the first perimeter as a line and/or curve that is adjacent and/or overlapping the first boundary. In at least one implementation, the first perimeter is generated as a Bézier curve with endpoints position to coincide with intersections of the first boundary of the join region and the perimeters of the first shape and the second shape.

Step 1812 generates a second perimeter of the join region such that the second perimeter is adjacent and/or overlapping the second boundary of the join region. The join module 140, for instance, generates the second perimeter as a line and/or curve that is adjacent and/or overlapping the second boundary. In at least one implementation, the second perimeter is generated as a Bézier curve with endpoints position to coincide with intersections of the first boundary of the join region and the perimeters of the first shape and the second shape.

Figure 19:
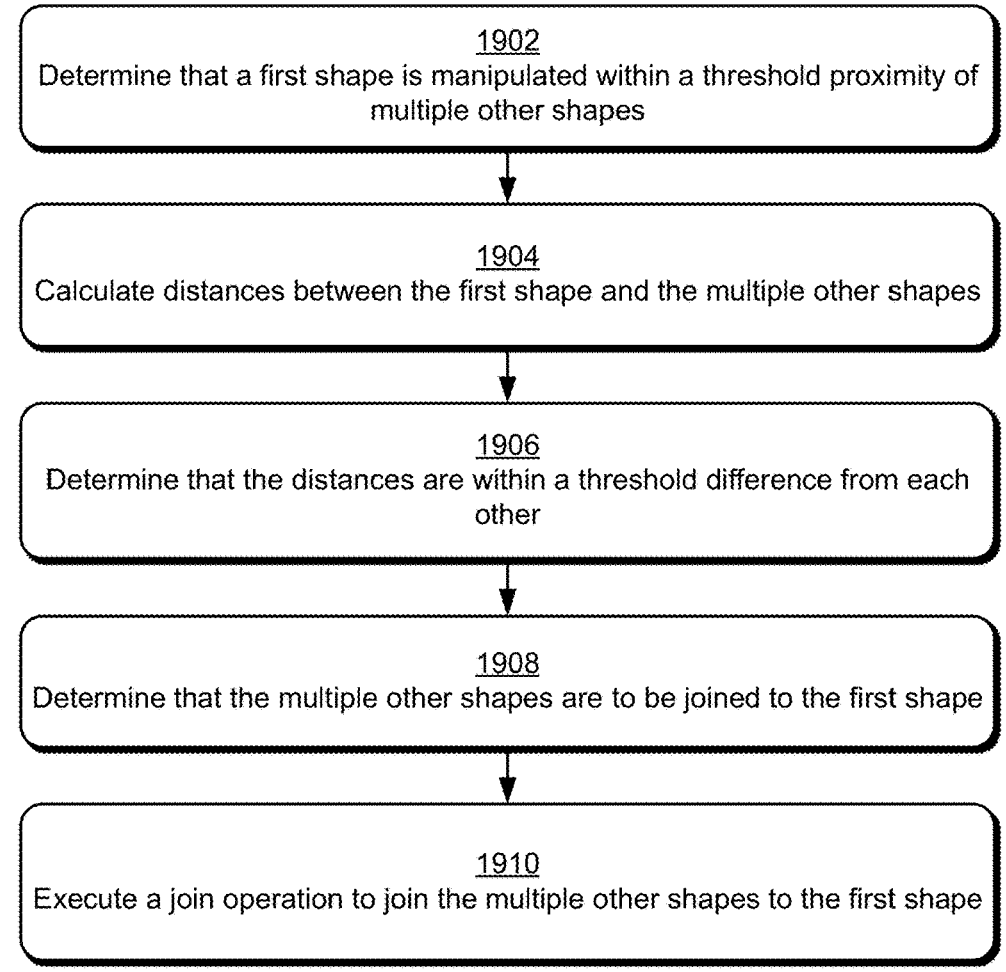
FIG. 19 depicts an example procedure for joining multiple shapes.

FIG. 19 depicts an example method 1900 for joining multiple shapes. For instance, the method is performed by the shape editor module 108 as part of a shape join operation, such as in conjunction with the method 1600.

Step 1902 determines that a first shape is manipulated within a threshold proximity of multiple other shapes. The proximity module 126, for example, detects that multiple shapes are within a defined proximity region for the first shape. A user, for instance, manipulates the first shape to within the threshold proximity to the multiple other shapes.

Step 1904 calculates distances between the first shape and the multiple other shapes. For instance, the proximity module 126 calculates a distance between a perimeter of the first shape and closest points on the perimeters of each of the multiple other shapes. Step 1906 determines that the distances are within a threshold difference from each other. The shape selection module 130, for example, compares the distances and determines that the distances are approximately the same. For instance, consider that the multiple other shapes include a second shape and a third shape. Further, the distance between the first shape and the second shape is x units (e.g., pixels, millimeters, etc.), and the distance between the first shape and the third shape is y units. The shape selection module 130 determines that the difference between x and y (e.g., |x−y|) is within a threshold difference, e.g., +/−ε units, where c is a predefined distance threshold difference.

Step 1908 determines that the multiple other shapes are to be joined to the first shape. The shape selection module 130, for instance, determines that the multiple other shapes are to be joined to the first shape in response to determining that the distances between the multiple other shapes and the first shape are within the threshold distance difference.

Step 1910 executes a join operation to join the multiple other shapes to the first shape. The join geometry module 134 and the join module 140, for example, execute cooperatively to calculate join geometries for the multiple other shapes, and to join the multiple other shapes to the first shape according to the calculated join geometries.

The example methods described above may be performed in various ways, such as for implementing different aspects of the systems and scenarios described herein. For instance, aspects of the methods may be implemented by the shape editor module 108 and various aspects of the methods may be implemented via the different GUIs described above. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Accordingly, the described techniques provide automated processes for joining shapes based on detected shape proximity. Having described example procedures in accordance with one or more implementations, consider now an example system and device that can be utilized to implement the various techniques described herein.

Example System and Device

Figure 20:
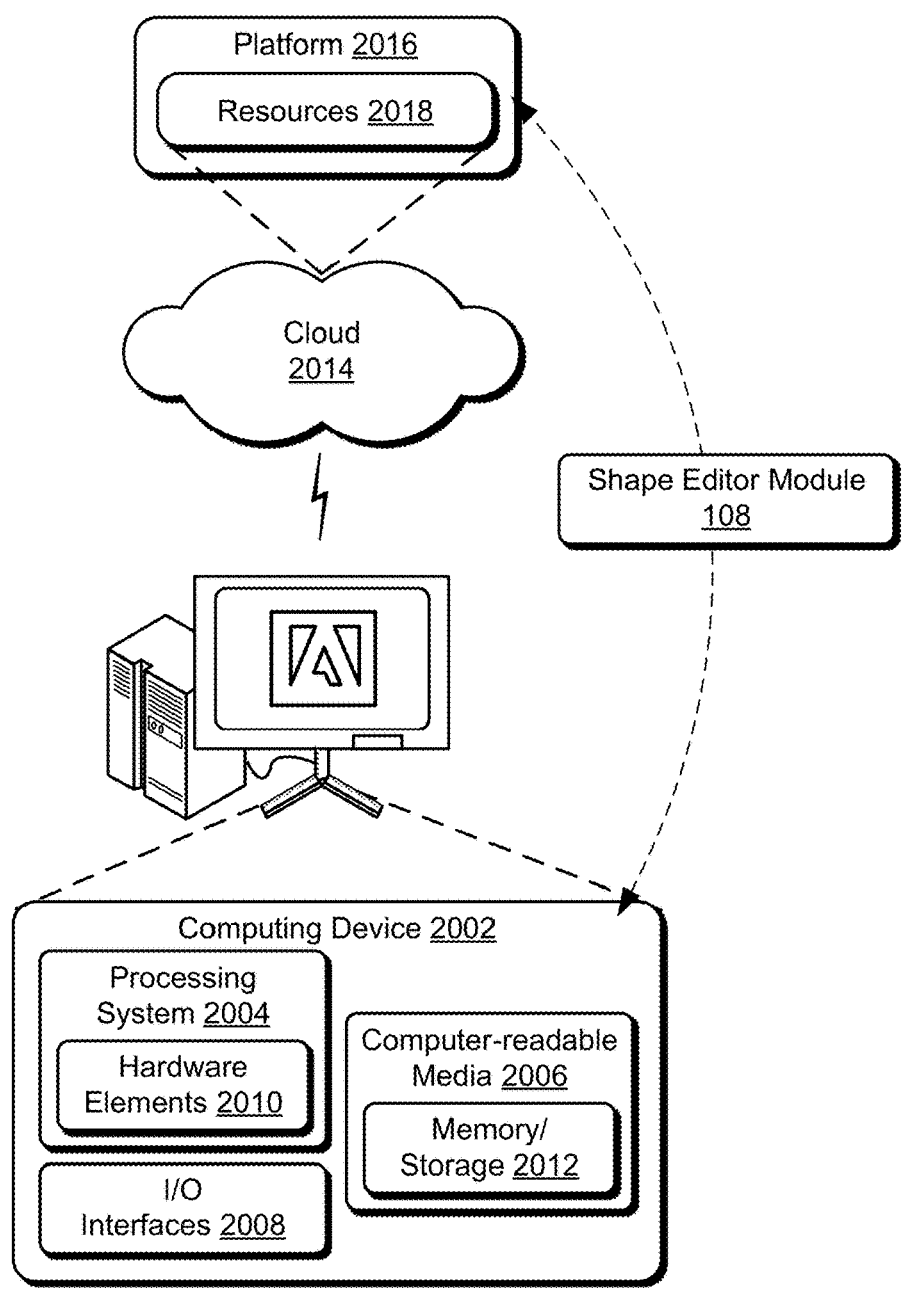
FIG. 20 illustrates an example system including various components of an example device that can be implemented as any type of computing device as described and/or utilized with reference to FIGS. 1a-19 to implement aspects of the techniques described herein.

FIG. 20 illustrates an example system generally at 2000 that includes an example computing device 2002 that is representative of one or more computing systems and/or devices that may implement the various techniques described herein. This is illustrated through inclusion of the object editor module 108. The computing device 2002 may be, for example, a server of a service provider, a device associated with a client (e.g., a client device), an on-chip system, and/or any other suitable computing device or computing system.

The example computing device 2002 as illustrated includes a processing system 2004, one or more computer-readable media 2006, and one or more I/O interfaces 2008 that are communicatively coupled, one to another. Although not shown, the computing device 2002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2004 is representative of functionality to perform one or more operations using hardware. Accordingly, the processing system 2004 is illustrated as including hardware elements 2010 that may be configured as processors, functional blocks, and so forth. This may include implementation in hardware as an application specific integrated circuit or other logic device formed using one or more semiconductors. The hardware elements 2010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2006 is illustrated as including memory/storage 2012. The memory/storage 2012 represents memory/storage capacity associated with one or more computer-readable media. The memory/storage component 2012 may include volatile media (such as random access memory (RAM)) and/or nonvolatile media (such as read only memory (ROM), Flash memory, optical disks, magnetic disks, and so forth). The memory/storage component 2012 may include fixed media (e.g., RAM, ROM, a fixed hard drive, and so on) as well as removable media (e.g., Flash memory, a removable hard drive, an optical disc, and so forth). The computer-readable media 2006 may be configured in a variety of other ways as further described below.

Input/output interface(s) 2008 are representative of functionality to allow a user to enter commands and information to computing device 2002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se or transitory signals. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2010 and computer-readable media 2006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2010. The computing device 2002 may be configured to implement particular instructions and/or functions corresponding to the software and/or hardware modules. Accordingly, implementation of a module that is executable by the computing device 2002 as software may be achieved at least partially in hardware, e.g., through use of computer-readable storage media and/or hardware elements 2010 of the processing system 2004. The instructions and/or functions may be executable/operable by one or more articles of manufacture (for example, one or more computing devices 2002 and/or processing systems 2004) to implement techniques, modules, and examples described herein.

The techniques described herein may be supported by various configurations of the computing device 2002 and are not limited to the specific examples of the techniques described herein. This functionality may also be implemented all or in part through use of a distributed system, such as over a "cloud" 2014 via a platform 2016 as described below.

The cloud 2014 includes and/or is representative of a platform 2016 for resources 2018. The platform 2016 abstracts underlying functionality of hardware (e.g., servers) and software resources of the cloud 2014. The resources 2018 may include applications and/or data that can be utilized while computer processing is executed on servers that are remote from the computing device 2002. Resources 2018 can also include services provided over the Internet and/or through a subscriber network, such as a cellular or Wi-Fi network.

The platform 2016 may abstract resources and functions to connect the computing device 2002 with other computing devices. The platform 2016 may also serve to abstract scaling of resources to provide a corresponding level of scale to encountered demand for the resources 2018 that are implemented via the platform 2016. Accordingly, in an interconnected device embodiment, implementation of functionality described herein may be distributed throughout the system 2000. For example, the functionality may be implemented in part on the computing device 2002 as well as via the platform 2016 that abstracts the functionality of the cloud 2014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method for joining shapes implemented by at least one computing device, the method comprising:
   detecting, by a shape selection module that receives shape proximity data describing shape proximity, that a first shape is manipulated within a threshold proximity to a second shape;
   determining, by the shape selection module and based on said detecting, that the second shape is to be joined to the first shape;
   generating, by a join geometry module, a geometry of a join region to be used to join the second shape to the first shape by generating a logical axis for the join region as a logical line from a point on the perimeter of the first shape to a point on a perimeter of the second shape, and generating the geometry of the join region to include join region boundaries extend on both sides of the logical axis; and
   joining, by a join module, the second shape to the first shape by generating the join region between the perimeter of the second shape and the perimeter of the first shape including generating perimeters of the join region adjacent the join region boundaries and that extend between the perimeter of the second shape and the perimeter of the first shape according to the generated geometry of the join region.

2. A method as described in claim 1, wherein said detecting that the first shape is manipulated within the threshold proximity to the second shape comprises detecting, by the shape selection module, that the perimeter of the second shape at least partially overlaps a defined proximity region of the first shape that extends outwardly from a perimeter of the first shape.

3. A method as described in claim 1, wherein said detecting that the first shape is manipulated within the threshold proximity to the second shape comprises detecting, by the shape selection module, that multiple shapes are within the threshold proximity to the first shape, and wherein said determining that the second shape is to be joined to the first shape is based on determining that the second shape is the closest shape of the multiple shapes to the first shape.

4. A method as described in claim 1, wherein said generating the geometry of the join region comprises:
  determining, by the join geometry module, a point on a perimeter of the first shape that is closest to a point on a perimeter of the second shape; and
  generating, by the join geometry module, the logical axis between the point on the perimeter of the first shape and the point on the perimeter of the second shape.

5. A method as described in claim 4, wherein said generating the geometry of the join region to extend on both sides of the logical axis comprises:
  determining, by the join geometry module, a width of the join region;
  defining, by the join geometry module, a first join region boundary of the join region by defining the first join region boundary at a distance of a fraction of the width at a first direction from the logical axis; and
  defining, by the join geometry module, a second join region boundary of the join region by defining the second join region boundary at a distance of a fraction of the width at a second direction from the logical axis.

6. A method as described in claim 5, wherein said generating the join region comprises:
  generating, by the join module, a first curve that extends from the perimeter of the first shape to the perimeter of the second shape and positioned adjacent the first join region boundary; and
  generating, by the join module, a second curve that extends from the perimeter of the first shape to the perimeter of the second shape and positioned adjacent the second join region boundary, the first curve and the second curve representing first and second perimeters of the join region, respectively.

7. A method as described in claim 1, wherein said generating the geometry of the join region and said joining the second shape to the first shape are performed automatically and responsive to said detecting that the first shape is manipulated to within the threshold proximity to the second shape.

8. A method as described in claim 1, wherein:
  said detecting comprises detecting, by the shape selection module, that the first shape is manipulated within the threshold proximity to the second shape and one or more other shapes; and
  said joining comprises concurrently joining, by the join module, the second shape and the one or more other shapes to the first shape.

9. A method as described in claim 1, wherein the first shape and the second shape comprise different portions of a digital image, the geometry of the join region is based on a gap between the first shape and the second shape, and said joining comprises filling the gap with the join region.

10. A method for joining shapes implemented by at least one computing device, the method comprising:
  detecting, by a shape selection module that receives shape proximity data describing shape proximity, that a first shape is manipulated to within a threshold proximity of multiple other shapes by determining, by the shape selection module, that the multiple other shapes are in contact with a defined proximity region that extends outwardly from a perimeter of the first shape;
  calculating, by a proximity module, a distance between a perimeter of the first shape and closest points on the perimeters of each of the multiple other shapes;
  determining, by the shape selection module, that a second shape from the multiple other shapes is to be joined to the first shape based on the second shape being the closest shape of the multiple other shapes to the perimeter of the first shape; and
  joining, by a join module, the second shape to the first shape by generating a join region that connects a perimeter of the second shape and the perimeter of the first shape to generate a joined shape.

11. A method as described in claim 10, wherein:
  the defined proximity region is equidistant from the perimeter of the first shape across a perimeter of the defined proximity region; and
  each of the multiple other shapes are one or more of in contact with or overlapping with the defined proximity region.

12. A method as described in claim 10, wherein the join region comprises a first join region boundary and a second join region boundary, said wherein said generating the join region comprises:
  generating, by the join module, a first curve adjacent the first join region boundary and extending from the perimeter of the first shape to the perimeter of the second shape to create a first perimeter of the join region; and
  generating, by the join module, a second curve adjacent the second join region boundary and extending from the perimeter of the first shape to the perimeter of the second shape to create a second perimeter of the join region.

13. A method as described in claim 12, wherein said generating the join region comprises:
  perforating, by the join module, the perimeter of the first shape at a first point and attaching a first endpoint of the first curve at the first point;
  perforating, by the join module, the perimeter of the first shape at a second point and attaching a first endpoint of the second curve at the second point, wherein a portion of the perimeter of the first shape is removed between the first point and the second point as part of generating the join region;
  perforating, by the join module, the perimeter of the second shape at a third point and attaching a second endpoint of the first curve at the third point; and
  perforating, by the join module, the perimeter of the second shape at a fourth point and attaching a second endpoint of the second curve at the fourth point, wherein a portion of the perimeter of the second shape is removed between the third point and the fourth point as part of generating the join region.

14. A method as described in claim 13, further comprising placing, by the join module, a control point on the first curve such that the control point is colinear with the first point on the perimeter of the first shape and a control point on the perimeter of the first shape, the first point being between the control point on the first curve and the control point on the perimeter of the first shape.

15. A method as described in claim 10, further comprising:
  detecting, by the join module, that the first shape is manipulated a second threshold proximity away from the second shape; and
  disconnecting, by the join module, the second shape from the first shape by removing the join region from between the second shape and the first shape.

16. A system for joining shapes, the system comprising:
  a shape editor module implemented at least partially in hardware of at least one computing device to implement:

a proximity module to determine a proximity between a first shape and one or more other shapes;

a shape selection module to determine, based on the proximity of the first shape and the one or more other shapes, that a second shape of the one or more other shapes is to be joined to the first shape;

a join geometry module to generate a join geometry for a join region to be used to join the second shape to the first shape, the join geometry module implemented to generate a logical axis for the join region as a logical line from a point on the perimeter of the first shape to a point on the perimeter of the second shape, and generate the geometry of the join region to include join region boundaries extend on both sides of the logical axis; and a join module to generate a joined shape by joining the second shape to the first shape using the join region by generating the join region between the perimeter of the second shape and the perimeter of the first shape including generating perimeters of the join region adjacent the join region boundaries and that extend between the perimeter of the second shape and the perimeter of the first shape according to the generated geometry of the join region.

17. A system as described in claim 16, wherein the join geometry module is implemented to:

generate a candidate geometry for the join region by defining a width for the join region relative to the logical axis;

define a first join region boundary of the join region at a defined distance at a first direction from the logical axis, and define a second join region boundary of the join region at the defined distance at a second direction from the logical axis;

determine that the first join region boundary will not connect to one or more of the first shape or the second shape at the defined distance; and adjust a position of the first join region boundary to generate the join geometry to enable the first join region boundary to connect to the one or more of the first shape or the second shape.

18. A system as described in claim 16, wherein the join module is implemented to generate the join shape by removing a portion of the perimeter of the first shape and attaching a first end of the join region adjacent the removed portion of the perimeter of the first shape, and removing a portion of the perimeter of the second shape and attaching a second end of the join region adjacent the removed portion of the perimeter of the second shape.

19. A system as described in claim 16, wherein:

the join geometry module is implemented to generate the join geometry for the join region by defining the first join region boundary for the join region at a distance from the logical axis, and defining the second join region boundary for the join region at the distance from the logical axis and opposite the first boundary; and the join module is implemented to generate the join region by generating a first curve between the perimeter of the first shape and the perimeter of the second shape and adjacent the first boundary, and a second curve between the perimeter of the first shape and the perimeter of the second shape and adjacent the second boundary.

20. A system as described in claim 19, wherein the shape editor module is implemented to generate a control point for the first curve by placing the control point such that the control point is located between the first curve and the logical axis such that the first curve and the second curve do not cross the logical axis thus avoiding overlap between the first curve and the second curve.

* * * * *